(12) United States Patent
Lee et al.

(10) Patent No.: US 9,118,531 B2
(45) Date of Patent: *Aug. 25, 2015

(54) METHOD OF GENERATING RANDOM ACCESS PREAMBLES IN WIRELESS COMMUNICATION SYSTEM

(75) Inventors: Hyun Woo Lee, Anyang-si (KR); Seung Hee Han, Anyang-si (KR); Min Seok Noh, Anyang-si (KR); Jin Sam Kwak, Anyang-si (KR); Dragan Vujcic, Anyang-si (KR); Dong Cheol Kim, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 554 days.

This patent is subject to a terminal disclaimer.

(21) Appl. No.: 13/533,827

(22) Filed: Jun. 26, 2012

(65) Prior Publication Data
US 2012/0263214 A1   Oct. 18, 2012

Related U.S. Application Data

(63) Continuation of application No. 12/050,023, filed on Mar. 17, 2008, now Pat. No. 8,234,325.

(60) Provisional application No. 60/895,412, filed on Mar. 16, 2007, provisional application No. 60/895,703, (Continued)

(30) Foreign Application Priority Data

Jun. 25, 2007   (KR) .................. 10-2007-0062371
Sep. 7, 2007    (KR) .................. 10-2007-0091198
Dec. 5, 2007    (KR) .................. 10-2007-0125290

(51) Int. Cl.
*H04L 27/26* (2006.01)
*H04J 13/00* (2011.01)
(Continued)

(52) U.S. Cl.
CPC ............. *H04L 27/261* (2013.01); *H04J 13/14* (2013.01); *H04L 5/023* (2013.01); *H04J 13/0062* (2013.01); *H04J 13/22* (2013.01)

(58) Field of Classification Search
CPC ......... H04L 27/261; H04L 5/023; H04J 13/14
USPC ................................. 708/200; 370/328, 329
See application file for complete search history.

(56) References Cited

U.S. PATENT DOCUMENTS 6,549,564 B1   4/2003   Popovic
6,574,212 B1   6/2003   Halton et al.
(Continued)

FOREIGN PATENT DOCUMENTS

CN   1364348      8/2002
JP   5114502      1/2013
KR   10-0626668   9/2006

OTHER PUBLICATIONS

Panasonic et al., "RACH Zadoff-Chu sequence definition and allocation", R1-071111, TSG-RAN WG1 Meeting #48, Feb. 2007.
(Continued)

*Primary Examiner* — Chuong D Ngo
(74) *Attorney, Agent, or Firm* — Lee, Hong, Degerman, Kang & Waimey

(57) ABSTRACT

A method of generating random access preambles includes receiving information on a source logical index and generating random access preambles in the order of increasing cyclic shift from root ZC sequences with the consecutive logical indexes from the beginning of the source logical index until a predetermined number of the random access preambles are found, wherein the consecutive logical indexes are mapped to root indexes of the root ZC sequences.

8 Claims, 31 Drawing Sheets

Related U.S. Application Data filed on Mar. 19, 2007, provisional application No. 60/896,237, filed on Mar. 21, 2007, provisional application No. 60/955,830, filed on Aug. 14, 2007, provisional application No. 60/972,257, filed on Sep. 14, 2007, provisional application No. 60/976,125, filed on Sep. 28, 2007, provisional application No. 60/980,293, filed on Oct. 16, 2007.

(51) Int. Cl.
*H04J 13/14* (2011.01)
*H04L 5/02* (2006.01)
*H04J 13/22* (2011.01)

(56) References Cited

U.S. PATENT DOCUMENTS

| | | | |
|---|---|---|---|
| 6,791,963 | B1 | 9/2004 | Hwang et al. |
| 8,234,325 | B2 * | 7/2012 | Lee et al. ............ 708/426 |
| 2006/0050799 | A1 | 3/2006 | Hou et al. |
| 2006/0068830 | A1 | 3/2006 | Klomsdorf et al. |
| 2006/0126573 | A1 | 6/2006 | Dick et al. |
| 2007/0230600 | A1 | 10/2007 | Bertrand et al. |
| 2008/0049690 | A1 | 2/2008 | Kuchibhotla et al. |
| 2008/0049851 | A1 | 2/2008 | Nangia et al. |
| 2008/0075184 | A1 | 3/2008 | Muharemovic et al. |
| 2008/0075195 | A1 | 3/2008 | Pajukoski et al. |
| 2008/0101306 | A1 | 5/2008 | Bertrand et al. |
| 2008/0139237 | A1 | 6/2008 | Papasakellariou |
| 2008/0165903 | A1 | 7/2008 | Hooli et al. |
| 2008/0170608 | A1 | 7/2008 | Guey |
| 2008/0205375 | A1 | 8/2008 | Onggosanusi et al. |
| 2008/0225785 | A1 | 9/2008 | Wang et al. |

OTHER PUBLICATIONS

Panasonic et al., "Zadoff-Chu sequence allocation on RACH for complexity reduction", R1-070189, TSG-RAN WG1 Meeting #47bis, Jan. 2007.

Texas Instruments, "Primary SCH (P-SCH) Code Design and Performance", R1-070722, 3GPP TSG RAN WG1 48, Feb. 2007.

Panasonic et al., "Uplink Reference Signal Structure and Allocation for E-UTRA," R1-070190, TSG-RAN WG1 Meeting #47bis, Jan. 2007, XP-050104232.

LG Electronics, "Ways to Mitigate Frequency Offset with CAZAC Cyclic Shift," R1-070227, 3GPP TSG RAN WG1 Meeting #47bis, Jan. 2007, XP-050104266.

Nokia, "Restricted Sets of RACH Preamble Signatures for Environments with High Doppler Shifts," R1-070377, 3GPP TSG RAN WG1 #47bis, Jan. 2007, XP-050104409.

Panasonic et al., "RACH Zadoff-Chu Sequence Definition and Allocation," R1-070934, TSG-RAN WG1 Meeting #48, Feb. 2007, XP-050104944.

Intellectual Property Office of India Application Serial No. 2761/KOLNP/2009, Office Action dated Jun. 4, 2013, 1 page.

LG Electronics, "Preamble Index Mapping for Non-Synchronized RACH", 3GPP TSG RAN WG1 Meeting #50, R1-073501, Aug. 2007.

Panasonic, et al., "RACH Zadoff-Chu sequence definition and allocation," TSG-RAN WG1 Meeting #48, R1-071111, Feb. 2007, 3 pages.

Panasonic, et al., "Zadoff-Chu sequence allocation on RACH for complexity reduction," TSG-RAN WG1 Meeting #47bis, R1-070189, Jan. 2007, 4 pages.

Nokia, "Restricted sets of RACH preamble signatures for environments with high Doppler shifts," 3GPP TSG RAN WG1 #47bis, R1-070377, Jan. 2007, 6 pages.

Texas Instruments, "Primary SCH (P-SCH) Code Design and Performance," 3GPP TSG RAN WG1 48, R1-070722, Feb. 2007, 6 pages.

LG Electronics, "Ways to Mitigate Frequency Offset with CAZAC Cyclic Shift," 3GPP TSG RAN WG1 Meeting #47bis, R1-070227, Jan. 2007, 8 pages.

Japan Patent Office Application Serial No. 2012-227940, Office Action dated Aug. 14, 2013, 3 pages.

The State Intellectual Property Office of the People's Republic of China Application Serial No. 200880008594.3, Certificate dated May 1, 2013, 50 pages.

Panasonic, "RACH sequence indication method on BCH," 3GPP TSG RAN WG1 Meeting #48bis, R1-071519, Mar. 2007, 3 pages.

European Patent Office Application Serial No. 08004802.8, Certificate dated Mar. 12, 2014, 66 pages.

Japan Patent Office Application Serial No. 2012-227940, Notice of Allowance dated Oct. 22, 2013, 3 pages.

* cited by examiner

METHOD OF GENERATING RANDOM ACCESS PREAMBLES IN WIRELESS COMMUNICATION SYSTEM

CROSS-REFERENCE TO RELATED APPLICATIONS

This application is a continuation of U.S. application Ser. No. 12/050,023, filed on Mar. 17, 2008, now U.S. Pat. No. 8,234,325, which claims the benefit of earlier filing date and right of priority to Korean Patent Application No. 10-2007-0062371 filed on Jun. 25, 2007, Korean Patent Application No. 10-2007-0091198 filed on Sep. 7, 2007, and Korean Patent Application No. 10-2007-0125290 filed on Dec. 5, 2007, and also claims the benefit of U.S. Provisional application Ser. No. 60/895,412 filed on Mar. 16, 2007, U.S. Provisional application Ser. No. 60/895,703 filed on Mar. 19, 2007, U.S. Provisional application Ser. No. 60/896,237 filed on Mar. 21, 2007, U.S. Provisional application Ser. No. 60/955,830 filed on Aug. 14, 2007, U.S. Provisional application Ser. No. 60/972,257 filed on Sep. 14, 2007, U.S. Provisional application Ser. No. 60/976,125 filed on Sep. 28, 2007, and U.S. Provisional application Ser. No. 60/980,293 filed on Oct. 16, 2007, the contents of which are incorporated by reference herein in their entirety.

BACKGROUND

1. Technical Field

The present invention relates to wireless communication and, in particular, to a method of generating random access preambles in a wireless communication system.

2. Related Art

The 3GPP (3rd Generation Partnership Project) mobile communication system based on WCDMA (Wideband Code Division Multiple Access) radio access technologies is widely deployed all over the world. An HSDPA (High Speed Downlink Packet Access), which could be defined as the first evaluation phase of the WCDMA, provides radio access technologies that are highly competitive in the mid-term future. However, because radio access technologies are being constantly advanced to meet the increasing demands and expectations of users and providers, new technological evolution is required in the 3GPP to ensure competitiveness in the future.

One of the systems that are considered to follow the 3rd generation systems is an OFDM (Orthogonal Frequency Division Multiplexing) system that attenuates inter-symbol interference (ISI) with low complexity. In the OFDM, serially inputted data symbols are converted into the N number of parallel data symbols, transmitted on the N number of orthogonal subcarriers. The subcarriers maintain orthogonality in frequency domain. Respective orthogonal channels experience mutually independent frequency selective fading, and when the interval between symbols is long enough, ISI can be canceled. An OFDMA (Orthogonal Frequency Division Multiple Access) refers to a multiple access method using the OFDM as modulation scheme. In the OFDMA, the frequency resources, namely, the subcarriers, are provided to each user. In this case, because each frequency resource is independently provided to a plurality of users, the frequency resources do not overlap with each other. Namely, the frequency resources are allocated to the users exclusively.

In order to transmit or receive a data packet, control information needs to be transmitted. For example, uplink control information includes ACK (Acknowledgement)/NACK (Negative-Acknowledgement) signals indicating successful transmission of downlink data, a CQI (Channel Quality Indicator) indicating quality of a downlink channel, a PMI (Precoding Matrix Index), an RI (Rank Indicator), etc. In addition, a random access preamble needs to be transmitted to perform a random access procedure.

A sequence is commonly used to transmit the uplink control information or the random access preamble. The sequence is transmitted in the form of a spreading code, a user equipment identifier, or a signature via a control channel or a random access channel.

FIG. 1 is an exemplary view showing a method for performing a random access procedure in a WCDMA system. The random access procedure is performed to allow a user equipment to acquire uplink synchronization with a network or acquire uplink radio resources for transmitting uplink data.

Referring to FIG. 1, a user equipment transmits a preamble via a PRACH (Physical Random Access Channel) which is an uplink physical channel. The preamble is transmitted during the access slot of 1.33 ms. The preamble is randomly selected from sixteen preambles.

Upon receiving the preamble from the user equipment, a base station transmits a response via an AICH (Acquisition Indicator Channel) which is a downlink physical channel. The base station transmits an acknowledgement (ACK) or a negative acknowledgement (NACK) to the user equipment via the AICH. If the user equipment receives ACK, the user equipment transmits a message having a length of 10 ms or 20 ms by using an OVSF (Orthogonal Variable Spreading Factor) code corresponding to the preamble. If the user equipment receives NACK, the user equipment transmits the preamble again in a suitable time. If the user equipment fails to receive a response corresponding to the previously transmitted preamble, the user equipment transmits a new preamble with power level higher than that of the previous preamble after a determined access slot.

The user equipment acquire information on sixteen preambles (namely, sequences), and uses one selected from the sixteen preambles as a preamble in the random access procedure. If the base station informs the user equipment of information regarding every available sequence, signaling overhead may be increased. So, generally, the base station previously designates sets of sequences and transfers an index of the sets of sequences to the sixteen preambles. For this purpose, the user equipment and the base station should store the sets of sequences according to the index in their buffer, respectively. This may be burdensome if the number of sequences belonging to the sequence sets is increased or the number of sets of sequences is increased.

In order to enhance performance of data detection in a receiver and increase capability, correlation or CM (Cubic Metric) characteristics of the sequences should be guaranteed to a degree. This means that the sequences belonging to the sequence sets used for the random access procedure should have correlation or CM characteristics guaranteed by more than a certain level. In particular, a sequence used for a high speed environment in which the user equipment is moved by a speed of 30 km/h or faster and a sequence used for a low speed environment need to be separately used in order to guarantee sequence characteristics in consideration of Doppler effect.

A method is sought for guaranteeing the characteristics of sequences used for transmission of the uplink control information with smaller amount of signaling overhead.

SUMMARY

A method of generating logical indexes of root Zadoff-Chu (ZC) sequences to facilitate sequence generation is provided.

A method of performing a random access procedure in a wireless communication system using the logical indexes of root ZC sequences is provided.

A method of generating random access preambles using the logical indexes of root ZC sequences is provided.

In an aspect, a method of generating logical indexes of root Zadoff-Chu (ZC) sequences is provided. The method includes dividing a plurality of root indexes of root ZC sequences into one or more subgroups according to predetermined cyclic shift parameters, a subgroup including at least one root index of a root ZC sequence and mapping the root indexes of the root ZC sequences in the subgroup to consecutive logical indexes.

In another aspect, a method of performing random access procedure in a wireless communication system is provided. The method includes selecting a random access preamble from a plurality of random access preambles, the plurality of random access preambles being generated from available cyclic shifts of root ZC sequences with consecutive logical indexes, wherein the consecutive logical indexes are mapped to root indexes of the root ZC sequences, transmitting the selected random access preamble and receiving a random access response including the identifier of the selected random access preamble.

In still another aspect, a method of performing random access procedure in a wireless communication system is provided. The method includes transmitting a source logical index for generating a plurality of random access preambles and a predetermined cyclic shift parameter, receiving a random access preamble selected from the plurality of random access preambles, the plurality of random access preambles being generated from available cyclic shifts of root ZC sequences with the source logical index and at least one consecutive logical index of the source logical index and transmitting a random access response including the identifier of the random access preamble.

In still another aspect, a method of generating random access preambles is provided. The method includes generating random access preambles in the order of increasing cyclic shift from a first root ZC sequence with a first root index mapped to a first logical index and generating additional random access preambles in the order of increasing cyclic shift from a second root ZC sequence with a second root index mapped to a second logical index when a predetermined number of random access preambles cannot be generated from the first root ZC sequence, the second logical index being consecutive to the first logical index.

In still another aspect, a method of generating random access preambles includes receiving information on a source logical index and generating random access preambles in the order of increasing cyclic shift from root ZC sequences with the consecutive logical indexes from the beginning of the source logical index until a predetermined number of the random access preambles are found, wherein the consecutive logical indexes are mapped to root indexes of the root ZC sequences.

DESCRIPTION OF EXEMPLARY EMBODIMENTS

Figure 1:
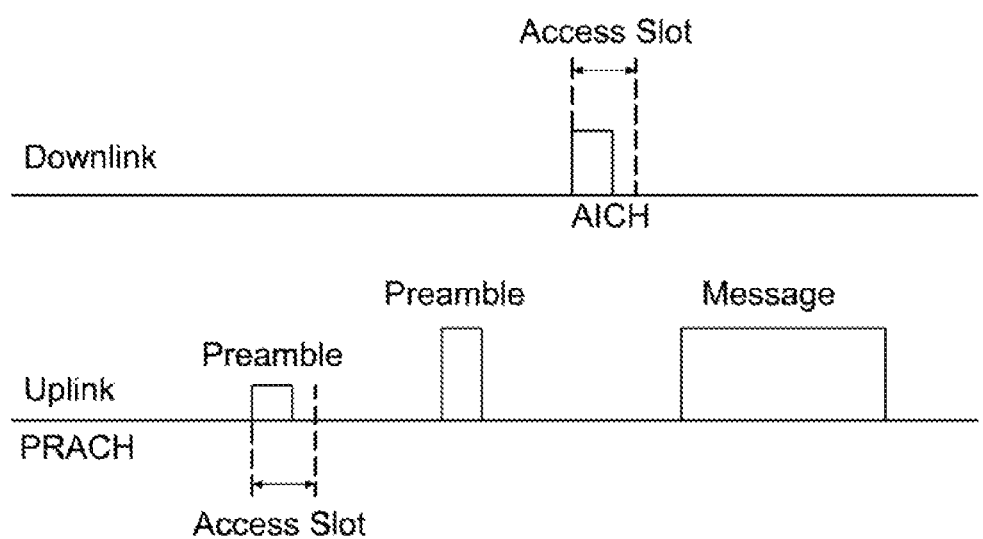
FIG. 1 is an exemplary view showing a method of performing a random access procedure in a WCDMA system.
Figure 2:
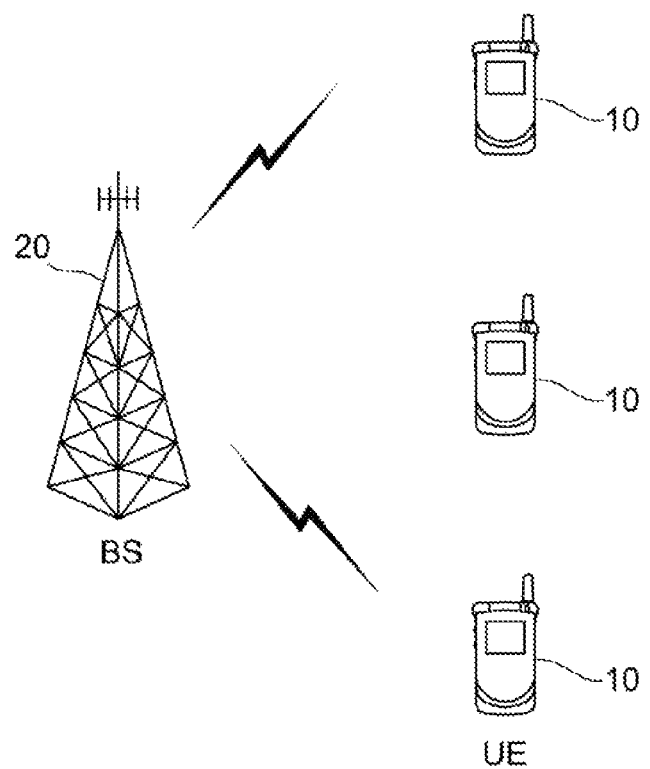
FIG. 2 is a view showing a wireless communication system.

FIG. 2 illustrates a wireless communication system. The wireless communication system can widely be deployed to provide various communication services such as voice and packet data, etc.

Referring to FIG. 2, a wireless communication system includes a user equipment (UE) 10 and a base station (BS) 20. The UE 10, which may be fixed or mobile, may be called other terms such as an MS (Mobile Station), a UT (User Terminal), an SS (Subscriber Station), a wireless device, and so on. The BS 20 refers to a fixed station that communicates with the UE 10, and may be also called a Node-B, a BTS (Base Transceiver System), an AP (Access Point), and so on. One or more cells may exist in a BS 20.

Hereinafter, downlink refers to communication from the BS 20 to the UE 10, and uplink refers to communication from the UE 10 to the BS 20. In the downlink, a transmitter may be a part of the BS 20, and a receiver may be a part of the UE 10. In the uplink, a transmitter may be a part of the UE 10 and a receiver may be a part of the BS 20.

There is no limitation in multiple access techniques applied to the wireless communication system. For example, various multiple access techniques such as CDMA (Code Division Multiple Access), TDMA (Time Division Multiple Access), FDMA (Frequency Division Multiple Access), SC-FDMA (Single Carrier-FDMA), and OFDMA (Orthogonal Frequency Division Multiple Access) can be used. For clarification, the OFDMA-based wireless communication system will now be described hereinafter.

The OFDM uses a plurality of orthogonal subcarriers. The OFDM uses orthogonality between IFFT (Inverse Fast Fourier Transform) and FFT (Fast Fourier Transform). A transmitter performs IFFT on data and transmits the same. A receiver performs FFT on a received signal to restore the original data. The transmitter uses IFFT to combine multiple subcarriers and the receiver uses corresponding FFT to split the combined multiple subcarriers. According to the OFDM, the complexity of the receiver in a frequency selective fading environment of a broadband channel can be reduced and a spectral efficiency can be improved through selective scheduling in a frequency domain by utilizing different channel characteristics of subcarriers. The OFDMA is a multiple access scheme based on the OFDM. According to the OFDMA, different subcarriers can be allocated to a plurality of users, thereby improving the efficiency of radio resources.

There may be various types of control information such as an ACK (Acknowledgement)/NACK (Negative Acknowledgement) signal indicating whether or not re-transmission should be performed, a CQI (Channel Quality Indicator) indicating quality of a downlink channel, a random access preamble for a random access procedure, and MIMO control information such as a PMI (Precoding Matrix Index), an RI (Rank Indicator), etc.

An orthogonal sequence may be used to transmit control information. The orthogonal sequence refers to a sequence having good correlation characteristics. The orthogonal sequence may include, for example, a CAZAC (Constant Amplitude Zero Auto-Correction) sequence.

Regarding a ZC (Zadoff-Chu) sequence, one of the CAZAC sequences, the k-th element c(k) of a root ZC sequence which corresponds to a root index M may be expressed as shown:

$$c(k) = \exp\left\{-\frac{j\pi Mk(k+1)}{N}\right\}, \text{ for } N \text{ odd} \quad \text{[Equation 1]}$$

$$c(k) = \exp\left\{-\frac{j\pi Mk^2}{N}\right\}, \text{ for } N \text{ even}$$

where N is the length of the root ZC sequence, the root index M is relatively prime to N. If N is a prime number, the number of root indexes of the ZC sequence would be N−1.

The ZC sequence c(k) has the following three characteristics.

$$|c(k)| = 1 \text{ for all } k, N, M \quad \text{[Equation 2]}$$

$$R_{M;N}(d) = \begin{cases} 1, & \text{for } d = 0 \\ 0, & \text{for } \neq 0 \end{cases} \quad \text{[Equation 3]}$$

$$R_{M_1,M_2;N}(d) = const \text{ for all } M_1, M_2 \quad \text{[Equation 4]}$$

Equation 2 means that the size of the ZC sequence is always 1, and Equation 3 means that auto-correlation of the ZC sequence is expressed as a Dirac-delta function. Here, the auto-correlation is based on circular correlation. Equation 4 means that cross correlation is always a constant.

In the wireless communication system, if it is assumed that cells are discriminated by the root indexes of the ZC sequence, the user equipment would need to know a root index or a group of root indexes that can be used within a cell and the base station should broadcast an available root index or an available group of root indexes to the user equipment.

If the length of the ZC sequence is N, the number of root indexes would be to the number of relative prime numbers to N among the natural numbers smaller than N. If N is a prime number, the number of root indexes would be N−1. In this case, in order for the base station to inform the user equipment about one of the N−1 number of root indexes, ceil (log$_2$ (N−1)) bits are required. Ceil(x) indicates the smallest integer greater than x.

Each cell may use various number of root indexes according to a cell radius. If the cell radius increases, the number of ZC sequences that can maintain orthogonality through cyclic shift may be reduced due to an influence of propagation delay or a round trip delay and/or a delay spread. Namely, if the cell radius increases, although the length of the ZC sequence is fixed (regular, uniform), the number of available cyclic shifts in a corresponding root index may be reduced. Because the sequences created by the cyclic shifts in the root index have orthogonality to each other, so they are also called ZCZ (Zero Correlation Zone) sequences. The minimum number of ZC sequences allocated to user equipments in each cell should be guaranteed. Thus, if the cell radius increases, the number of root indexes used in each cell is increased to secure the minimum number of ZC sequences.

It is assumed that a group of available root ZC indexes in each cell is Ri, and the M number of groups of root ZC indexes in all is set. This can be expressed as $R_1, R_2, \ldots, R_M$. If $R_i$=10, it can be said that cells in which $R_i$ is set use 10 root ZC indexes. It is assumed that N=839, M=7, $R_1$=1, $R_2$=2, $R_3$=4, $R_4=8$, $R_5=16$, $R_6=32$, and $R_7=64$ according to each cell radius. Then, if the cell radius is large, minimum 7 bits (ceil ($\log_2(7)$)+ceil ($\log_2(838/64)$)=7 bits) is required to transmit control information, and if the cell radius is small, maximum 13 bits (ceil ($\log_2(7)$)+ceil ($\log_2(838/1)$)=13 bits) are required to transmit control information.

As wireless communication systems are advanced, demands for a higher transfer rate are increasing and cells having a smaller radius are increasing. Because such cells having a small radius use only a single root ZC index, more bits are required to transmit control information, possibly causing a signal overhead. Thus, a technique for reducing the number of bits required for signaling is necessary in each cell. In particular, it is important to reduce the number of signaling bits in the cells having the small cell radius.

Figure 3:
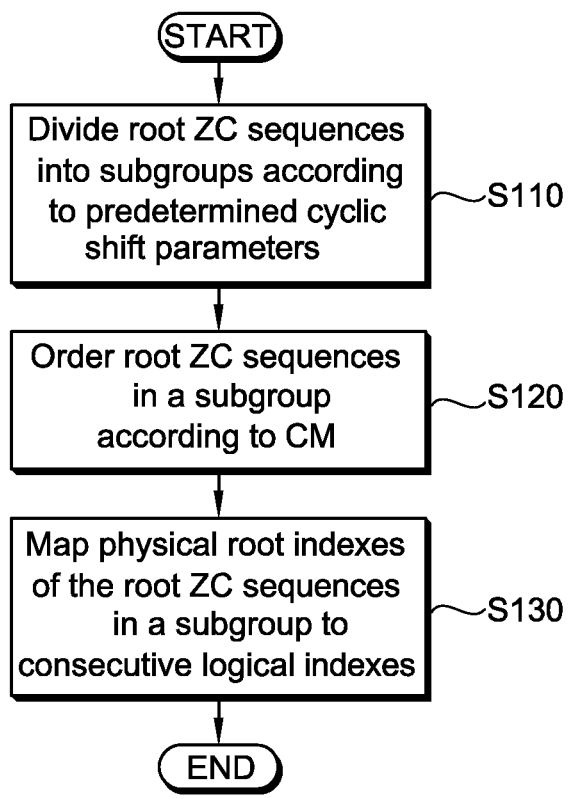
FIG. 3 is a flow chart illustrating the process of a method of generating sequences according to one exemplary embodiment of the present invention.

FIG. 3 is a flow chart illustrating the process of a method of generating sequences according to one exemplary embodiment of the present invention.

Referring to FIG. 3, a plurality of root ZC sequences is divided into one or more subgroups according to a predetermined cyclic shift parameter (S110). The subgroups include at least one root ZC sequence. If the cyclic shift parameter is Ncs, a root ZC sequence has zero correlation zones of length of Ncs−1. The cyclic shift parameter is a parameter for obtaining a cyclic shift unit of the root ZC sequence, and the subgroups may be ordered according to the cyclic shift parameter. Because the Doppler effect is strong in high speed environment, the cyclic shift unit is obtained by using the cyclic shift parameter according to each maximum supportable cell radius and a Doppler shift of detection stage. The cyclic shift unit is a unit for cyclic-shifting the root ZC sequence. The cyclic shift parameter of the root ZC sequence is smaller than or equal to the predetermined cyclic shift parameter of the subgroup of the root ZC sequence. The value of cyclic shift of the root ZC sequence is greater than the cyclic shift parameter of the root ZC sequence.

The root ZC sequences are ordered according to CM (Cubic Metric) in a subgroup (S120). The ordering of the root ZC sequences according to the CM characteristics refers to ordering the root ZC sequences according to the CM characteristics of the ZC sequences according to combination of the root ZC indexes. As the metric of ordering the root ZC sequences in a subgroup, cross-correlation, PAPR (Peak-to-Average Power Ratio), a Doppler frequency, etc, as well as the CM, may be used. The ordering according to the cross-correlation characteristics refers to ordering the root ZC sequences according to cross-correlation of ZC sequences according to combinations of the root ZC indexes. The ordering according to the PAPR characteristics refers to ordering the root ZC sequences according to PAPR characteristics of the ZC sequences according to combinations of the root ZC indexes. The ordering according to the Doppler frequency characteristics refers to ordering the root ZC sequences according to a robust degree of the root indexes to the Doppler frequency.

A gain can be obtained by using root indexes having a robust Doppler frequency in a relatively high mobility cell or high speed cell. In case of using restricted cyclic shifts in a high mobility cell, the root indexes of root ZC sequences can be ordered (or grouped) according to a maximum supportable cell radius or a maximum supportable cyclic shift characteristics. The root indexes of root ZC sequences can be divided into subgroups by comparing maximum supportable cyclic shift parameters and predetermined cyclic shift parameters of the respective root ZC cyclic sequences, whereby root ZC sequences in each subgroup can have similar characteristics.

Physical root indexes of root ZC sequences belonging to one subgroup are mapped to consecutive logical indexes (S130). The physical root indexes refer to root indexes of ZC sequences which are actually used for the base station and/or the user equipment to transmit control information or a random access preamble. The logical indexes refer to logical root indexes to which the physical root indexes are mapped.

In case that the root ZC sequences are divided into subgroups according to the predetermined cyclic shift parameters and the consecutive logical indexes are allocated in the subgroups as described above, the base station may inform the user equipment about only at least one logical index to provide information about a plurality of ZC sequences having similar characteristics. For example, it is assumed that the root ZC sequences are ordered in a subgroup according to the CM and a single logical index is informed to the user equipment. Then, the user equipment generates root ZC sequences from the physical root indexes to which the received single logical index is mapped. If the number of ZC sequences (e.g., the number of available cyclic shifts of the ZC sequences) generated from the single logical index is insufficient, the user equipment would generates new root ZC sequences from physical root indexes mapped to a logical index adjacent to the received logical index. Because the adjacent (consecutive) logical indexes have the similar CM characteristics, even if only one logical index is given, the user equipment can generate a plurality of ZC sequences having the similar CM characteristics.

<Example of Ordering According to CM Characteristics>

Figure 4:
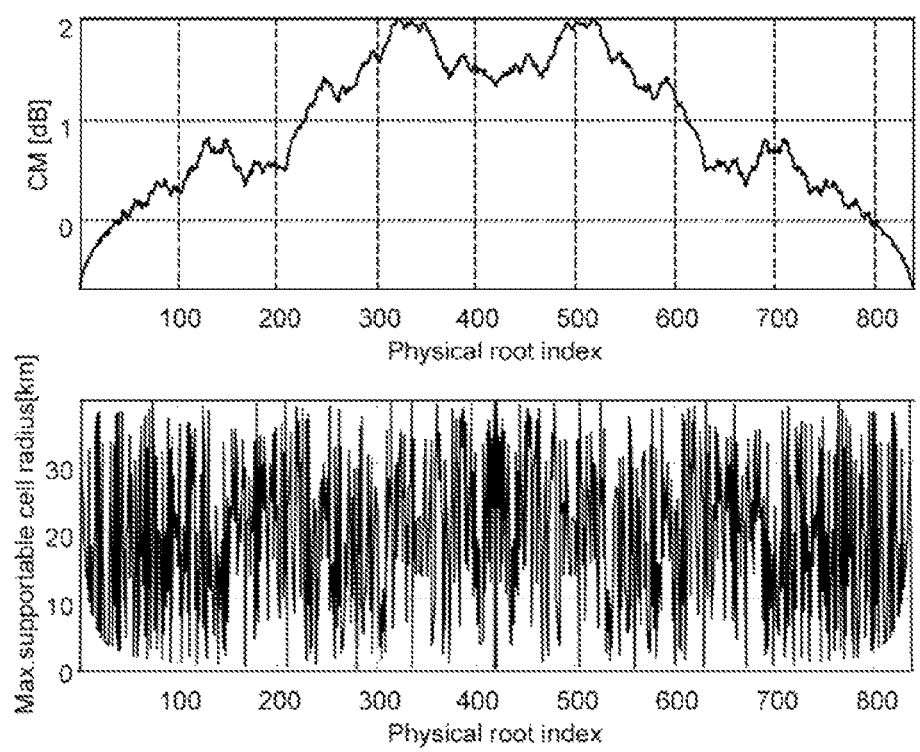
FIG. 4 is a graph showing CM (Cubic Metric) characteristics and maximum supportable cell radius characteristics according to physical root indexes according to one exemplary embodiment of the present invention.
Figure 5:
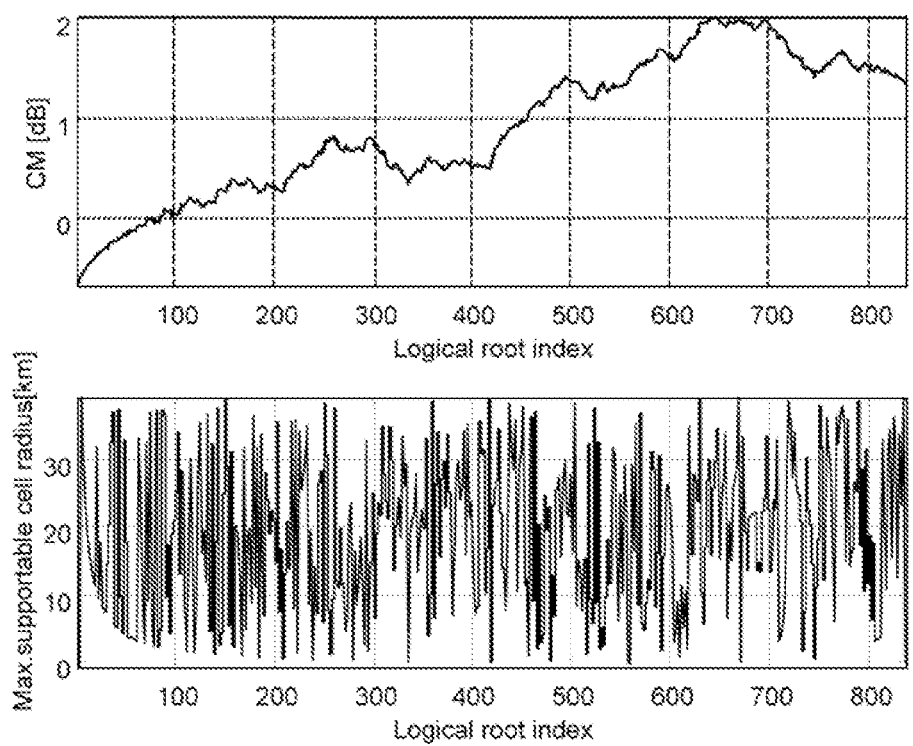
FIG. 5 is a graph showing CM characteristics and maximum supportable cell radius characteristics according to logical root indexes according to one exemplary embodiment of the present invention.
Figure 6:
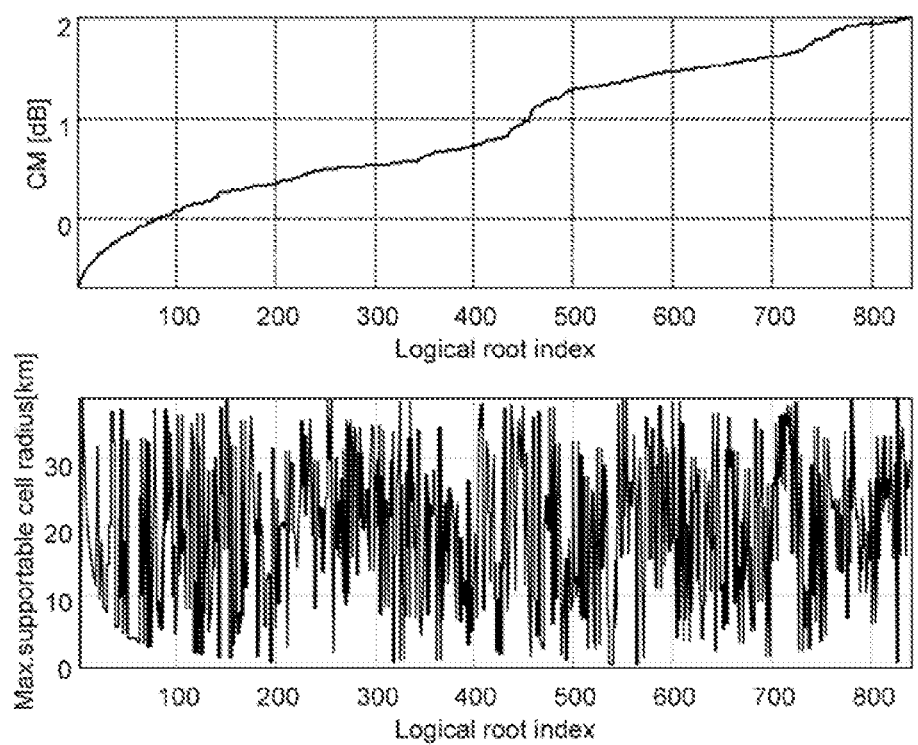
FIG. 6 is a graph showing CM characteristics and maximum supportable cell radius characteristics according to logical root indexes according to another exemplary embodiment of the present invention.

FIG. 4 is a graph showing CM (Cubic Metric) characteristics and maximum supportable cell radius characteristics according to physical root indexes according to one exemplary embodiment of the present invention. FIG. 5 is a graph showing the CM characteristics and maximum supportable cell radius characteristics according to logical root indexes according to one exemplary embodiment of the present invention. FIG. 6 is a graph showing the CM characteristics and maximum supportable cell radius characteristics according to logical root indexes according to another exemplary embodiment of the present invention.

If 'N' is the length of a ZC sequence, the physical root indexes in FIG. 4 may be expressed as $U_P=1, 2, 3, \ldots, N-3, N-2, N-1$. FIG. 5 shows the results obtained by alternately picking up the physical root indexes from the start and from the end, one by one, and re-ordering them as $U_L=1, N-1, 2, N-2, 3, N-3, 4, \ldots$ FIG. 6 shows the results obtained by ordering the physical indexes in FIG. 4 as CM values corresponding to the logical indexes.

Table 1 shows an example of CM-based ordering of the physical root indexes and logical indexes.

TABLE 1

| Logical index | Physical root index |
|---|---|
| 1~50 | 1  838  2  837  836  3  4  835  834  5  833  6  832  7  8  831  9  830  10  829  828  11  12  827  826  13  14  825  15  824  823  16  822  17  19  820  18  821  818  189  21  20  23  817  816  22  815  26  813  24 |

TABLE 1-continued

| Logical index | Physical root index |
|---|---|
| 51~100 | 25 814 29 812 810 809 27 811 30 28 808 31 804 33 805 32 34 35 807 806 799 36 40 803 797 42 798 38 801 41 37 39 802 800 796 790 43 44 49 789 795 52 50 788 787 51 793 47 791 46 |
| 101~150 | 48 792 794 786 53 45 64 774 55 775 785 54 65 784 64 776 69 783 773 56 779 772 769 770 771 70 60 67 61 66 59 780 777 68 778 57 62 782 781 71 58 768 93 746 72 767 764 75 104 763 |
| 151~200 | 94 76 735 745 105 734 92 73 766 103 747 765 736 74 95 737 744 101 102 748 738 91 99 740 90 749 762 77 98 741 100 755 743 84 96 739 757 82 78 761 83 756 106 733 168 671 754 85 97 753 |
| 201~250 | 86 742 89 750 758 81 732 107 88 751 79 80 759 760 670 167 672 169 87 752 731 108 669 170 673 109 166 730 171 674 165 668 172 667 728 111 665 174 186 729 675 110 653 164 175 187 666 664 173 652 |
| 251~300 | 163 676 209 679 116 630 185 727 112 160 631 723 208 639 655 654 200 207 206 721 635 118 722 632 204 117 633 184 651 680 188 201 638 205 681 159 663 634 119 720 158 114 725 176 161 650 641 113 678 115 |
| 301~350 | 189 193 677 198 202 724 637 726 656 636 194 640 645 203 162 646 199 183 629 210 642 197 195 192 180 120 657 644 719 179 190 647 191 662 649 659 157 177 648 182 660 181 682 196 643 658 178 661 718 121 |
| 351~400 | 156 717 683 211 122 628 685 154 124 715 716 694 140 123 155 699 684 145 137 700 704 686 141 627 135 701 212 139 134 698 702 138 153 705 714 695 125 144 142 143 697 696 146 213 693 626 136 133 703 706 |
| 401~450 | 152 687 151 688 214 713 625 126 128 711 132 692 147 712 624 215 707 150 689 127 709 690 691 130 148 129 149 710 623 708 216 131 622 217 621 218 219 620 220 619 223 616 221 618 617 222 615 224 613 226 |
| 451~500 | 227 612 225 614 611 228 229 610 230 609 231 608 236 603 607 232 235 604 606 233 234 602 605 237 601 238 262 261 239 577 578 580 260 579 600 259 581 258 263 576 582 599 257 240 269 570 256 583 571 575 |
| 501~550 | 270 598 241 268 569 264 242 272 567 274 244 597 565 595 265 566 573 596 243 267 564 276 574 271 275 563 572 568 584 562 255 561 277 278 253 266 420 419 560 279 254 573 586 585 587 252 245 594 588 421 |
| 551~600 | 589 249 250 418 590 251 246 417 593 422 416 423 248 280 559 591 247 424 415 373 466 592 426 413 414 425 412 427 411 428 281 430 374 558 465 376 407 463 409 432 410 372 467 462 557 429 282 436 403 395 |
| 601~650 | 464 377 433 375 406 431 444 402 283 371 404 556 408 437 443 468 435 396 369 471 445 394 470 446 461 442 378 368 434 284 405 397 555 469 370 393 401 447 398 554 392 438 367 472 459 285 380 441 400 287 |
| 651~700 | 552 439 440 286 553 460 379 381 399 458 551 291 288 448 548 290 537 391 549 366 302 473 547 289 457 292 550 536 382 383 456 303 449 365 390 304 300 474 363 476 535 539 538 546 534 540 293 305 301 299 |
| 701~750 | 450 477 364 388 389 541 455 362 384 475 451 453 298 386 478 387 361 454 452 545 294 385 479 544 542 360 543 297 295 306 296 533 307 532 308 531 530 359 309 480 358 481 310 357 482 529 527 355 312 311 |
| 751~800 | 484 485 528 356 483 354 313 526 525 353 314 486 487 343 495 496 352 344 351 497 488 342 511 328 345 329 510 327 494 315 350 524 512 340 489 498 499 316 318 500 513 521 341 339 523 493 501 508 319 326 |
| 801~838 | 317 346 338 506 522 331 337 332 325 507 490 492 348 502 491 520 333 330 349 334 347 514 509 505 336 504 503 335 321 519 324 515 320 322 518 516 |

Because the physical root indexes are ordered according to the CM characteristics and then mapped to the logical indexes, the CM characteristics of the ZC sequences corresponding to the consecutive logical indexes can be similarly maintained and a CM-based cell planning can be possibly performed. The base station may plan the CM-based cell in a power-limited environment such as in a cell where a channel environment is not good or in a cell having a large cell radius, etc. In addition, the base station may use indexes having good CM characteristics as dedicated preambles for handover or the like. A user equipment in a bad channel environment already uses its maximum power, so it can hardly obtain a power ramping effect. Then, the base station can allocate an index with good CM characteristics to the user equipment to increase a detection probability.

<Example of Ordering According to Maximum Supportable Cell Radius Characteristics>

Figure 7:
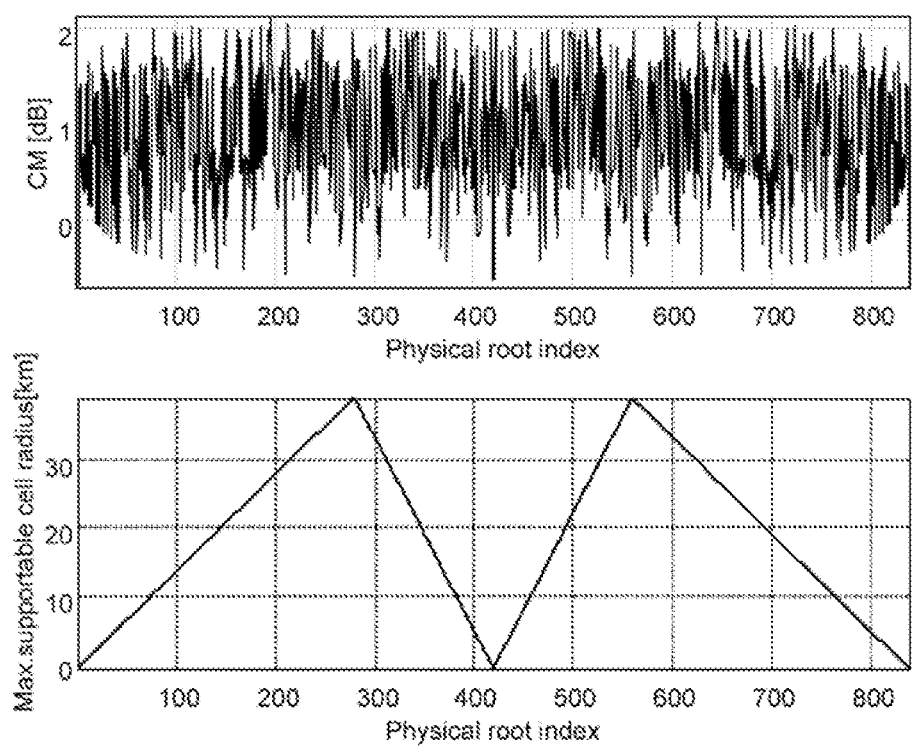
FIGS. 7 to 14 are graphs showing CM characteristics and maximum supportable cell radius characteristics according to logical root indexes according to still another exemplary embodiment of the present invention.
Figure 8:
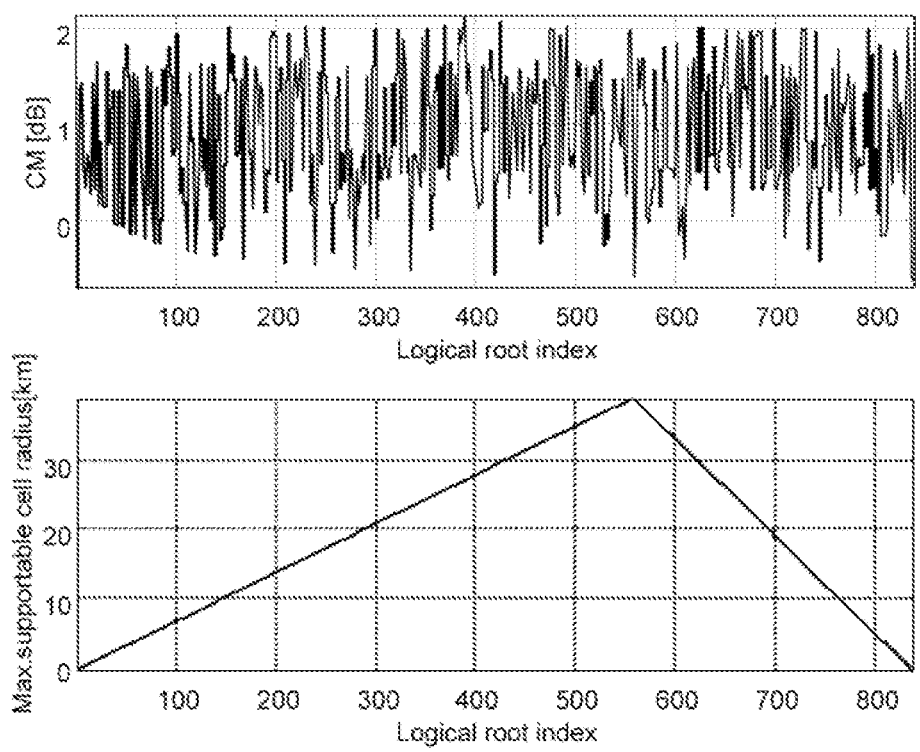
Figure 9:
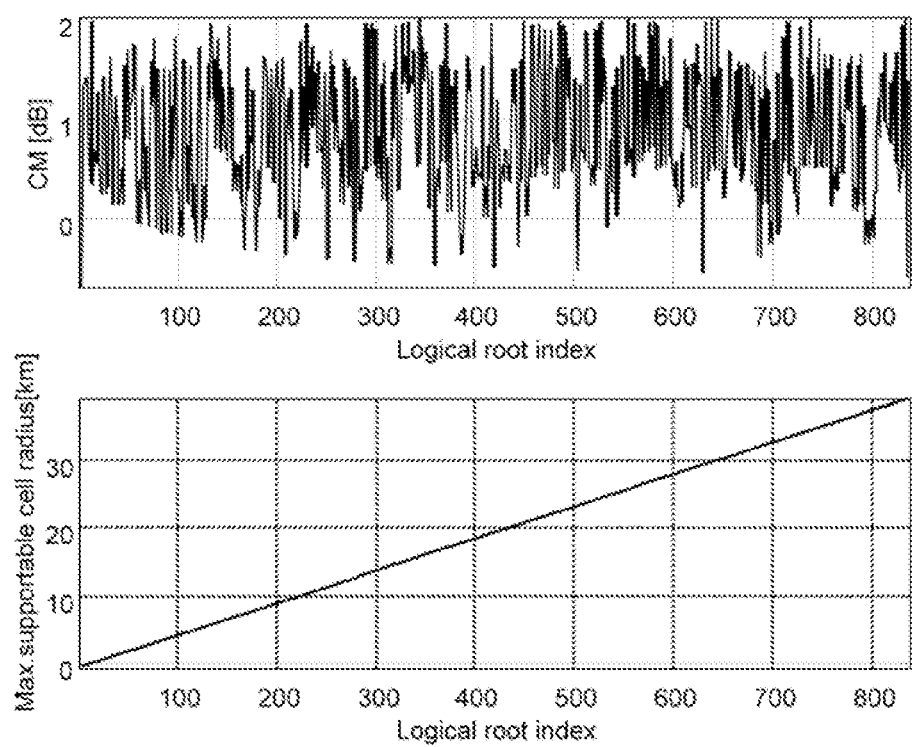

FIG. 7 is a graph showing CM characteristics and maximum supportable cell radius characteristics according to physical root indexes according to another exemplary embodiment of the present invention. FIG. 8 is a graph showing CM characteristics and maximum supportable cell radius characteristics according to logical root indexes according to another exemplary embodiment of the present invention. FIG. 9 is a graph showing CM characteristics and maximum supportable cell radius characteristics according to logical root indexes according to still another exemplary embodiment of the present invention.

Referring to FIGS. 7 to 9, FIG. 7 shows the ordering of ZC sequences used in FIG. 4 according to the maximum supportable cell radius. If 'N' is the length of the ZC sequence, the physical root indexes $U_p$=1, 2, 3, ..., N−3, N−2, N−1 in FIG. 7 are re-ordered by $(1/U_p)$ mod N. In this case, performing $(1/U_p)$ mod N on the ZC sequence indexes generated in time domain refers to mapping the ZC sequence indexes generated in the time domain to ZC sequence indexes generated in a frequency domain. In other words, such conversion refers to reordering the characteristics of ZC sequence indexes generated in a time domain as the ZC sequence indexes generated in a frequency domain. FIG. 8 shows the results obtained by alternately picking up the indexes, which have been converted from the physical indexes $U^p$ into $(1/U_p)$ mod N, from the start and from the end, one by one, and re-ordering them as 1, N−1, 2, N−2, 3, N−3, 4, ... FIG. 9 shows the results obtained by accurately re-ordering according to the maximum supportable cell radius corresponding to the physical indexes.

Table 2 shows an example of the maximum supportable cell radius-based ordering.

the maximum supportable cell radius characteristics may fail to obtain a gain in the CM characteristics.

TABLE 2

| Logical index | Physical root index |
|---|---|
| 1~50 | 1 2 837 838 419 429 279 280 559 560 210 629 168 336 503 671 140 699 120 240 599 719 105 734 93 373 466 746 84 755 229 305 534 610 70 769 129 258 581 710 60 779 56 112 727 783 367 472 148 296 |
| 51~100 | 543 691 233 606 265 309 530 574 42 797 40 80 759 799 267 572 73 146 693 766 35 804 235 302 537 604 355 484 31 404 435 808 30 809 29 405 434 810 28 811 27 406 433 812 236 603 178 356 483 661 |
| 101~150 | 74 765 24 48 791 815 303 536 68 136 703 771 287 552 43 86 753 796 21 818 266 307 532 573 20 819 39 78 761 800 286 553 261 317 522 578 383 456 125 357 482 714 402 437 137 274 565 702 151 688 |
| 151~200 | 181 329 510 658 242 597 95 190 649 744 202 637 61 122 717 778 15 824 103 368 471 736 217 622 128 256 583 711 14 825 55 110 729 784 203 636 253 293 546 586 118 721 142 284 555 697 89 750 263 288 |
| 201~250 | 551 576 37 802 231 304 535 608 12 827 130 260 579 709 268 571 23 46 793 816 34 805 179 358 481 660 276 563 207 316 523 632 398 441 223 308 531 616 409 430 145 290 549 694 133 706 91 374 465 748 |
| 251~300 | 10 829 227 306 533 612 400 439 135 270 569 704 143 696 66 132 707 773 289 550 83 378 461 756 228 611 9 415 424 830 241 598 53 106 733 786 201 638 173 346 493 666 351 488 161 339 500 678 344 495 |
| 301~350 | 108 216 623 731 255 584 57 391 448 782 121 718 8 16 823 831 372 467 149 345 494 690 101 738 254 331 508 585 389 450 257 325 514 582 412 427 245 297 542 594 184 655 197 321 518 642 311 528 251 294 |
| 351~400 | 545 588 64 775 141 282 557 698 7 832 104 208 631 735 392 447 191 382 457 648 318 521 47 396 443 792 273 566 218 403 436 621 59 780 13 26 813 826 71 768 269 301 538 570 375 464 82 164 675 757 |
| 401~450 | 144 695 87 174 665 752 401 438 49 98 741 790 152 687 169 338 501 670 6 833 119 238 601 720 65 774 88 176 663 751 134 705 81 162 677 758 408 431 234 371 468 605 17 822 107 366 473 732 330 509 |
| 451~500 | 50 100 739 789 138 701 170 340 499 669 158 681 249 341 498 590 199 640 171 342 497 668 154 685 248 343 496 591 215 624 99 370 469 740 347 492 175 350 489 664 353 486 239 300 539 600 187 652 211 417 |
| 501~550 | 422 628 5 834 139 278 561 700 153 686 157 314 525 682 200 639 97 194 645 742 352 487 163 326 513 676 348 491 237 365 474 602 33 806 75 150 689 764 275 564 51 394 445 788 189 650 243 298 541 596 |
| 551~600 | 114 725 195 322 517 644 212 627 166 332 507 673 299 540 182 364 475 657 393 446 123 246 593 716 319 520 213 313 526 626 333 506 185 327 512 654 244 595 115 362 477 724 250 589 156 312 527 683 172 667 |
| 601~650 | 96 192 647 743 54 785 62 124 715 777 292 547 221 397 442 618 224 615 77 381 458 762 359 480 277 281 558 562 4 835 167 334 505 672 186 653 193 323 516 646 247 592 160 320 519 679 369 470 58 116 |
| 651~700 | 723 781 127 712 272 295 544 567 225 614 205 410 429 634 291 548 79 380 459 760 206 633 220 399 440 619 271 568 85 377 462 754 92 747 11 414 425 828 259 580 69 385 454 770 264 575 18 36 803 821 |
| 701~750 | 147 692 25 407 432 814 32 807 177 354 485 662 349 490 165 337 502 674 416 423 94 188 651 745 52 787 183 328 511 656 196 643 113 363 476 726 324 515 214 411 428 625 159 684 198 641 |
| 751~800 | 117 361 478 722 283 556 63 388 451 776 109 730 102 204 635 737 390 449 111 222 617 728 413 426 230 379 460 609 384 455 45 90 749 794 285 554 67 386 453 772 607 19 38 801 820 41 798 22 44 |
| 801~838 | 795 817 72 767 131 262 577 708 376 463 226 387 452 613 219 620 126 525 587 713 395 444 180 360 479 659 76 763 209 315 524 630 335 504 3 418 |

The method of reordering according to the maximum supportable cell radius can be applicable in case of using restricted cyclic shifts in a high speed cell environment. In using the restricted cyclic shifts, a value of a supportable cyclic shift parameter Ncs may vary according to indexes. If the physical root indexes as shown in FIG. 4 are used as it is, it may be difficult to use the consecutive physical indexes in a single cell. Thus, indexes that are not repeated for each cell should be allocated in an overall network, but this may cause a problem: Reuse factors of a sequence are reduced to make cell planning difficult. This problem can be solved by using logical indexes ordered according to the maximum supportable cell radius characteristics, but such ordering according to <Example of Ordering According to CM Characteristics and Maximum Supportable Cell Radius Characteristics>

The ordering according to the CM characteristics and the ordering according to the maximum supportable cell radius characteristics may have the opposite characteristics. A method for achieving both gains of the CM characteristics and the maximum supportable cell radius characteristics will now be described.

The method of ordering by combining various characteristics follows the following procedures.

Step 1. The entire indexes are ordered according to specific (particular) characteristics.

Step 2. The entire indexes are divided into sections (or groups) based on relevant values (grouping).

Step 3. The indexes of the sections are ordered according to respective different characteristics in each section (or group).

Step 4. The steps 2 and 3 are repeated. In this case, in dividing the indexes into sections, a subsequent section may be associated with a preceding section, or the subsequent section may not have any relation with the preceding section and a new rule may be applied to the subsequent section.

Figure 10:
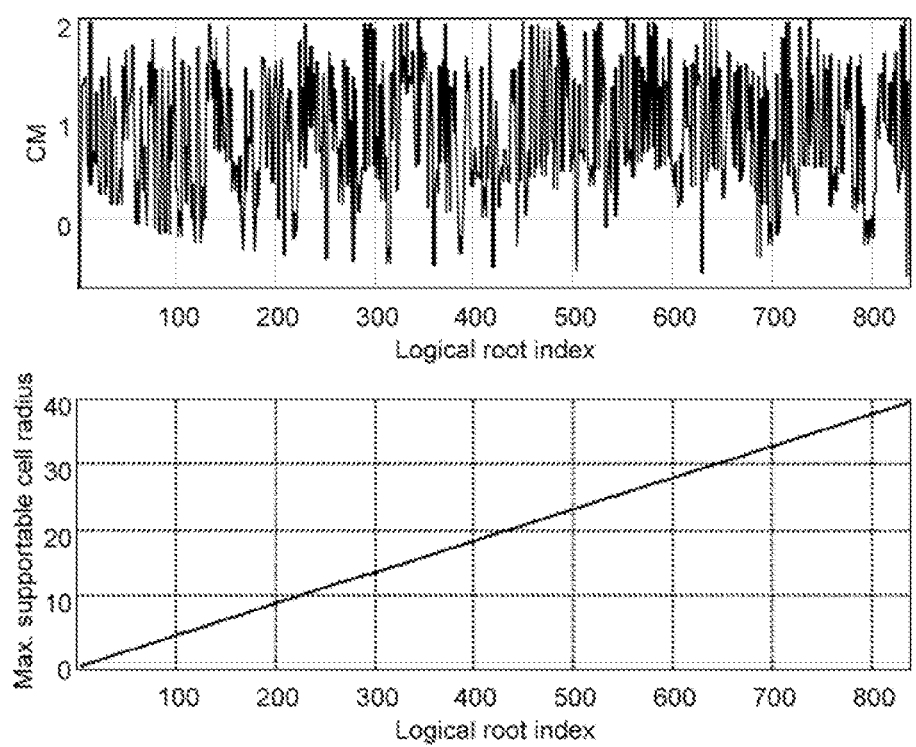
Figure 11:
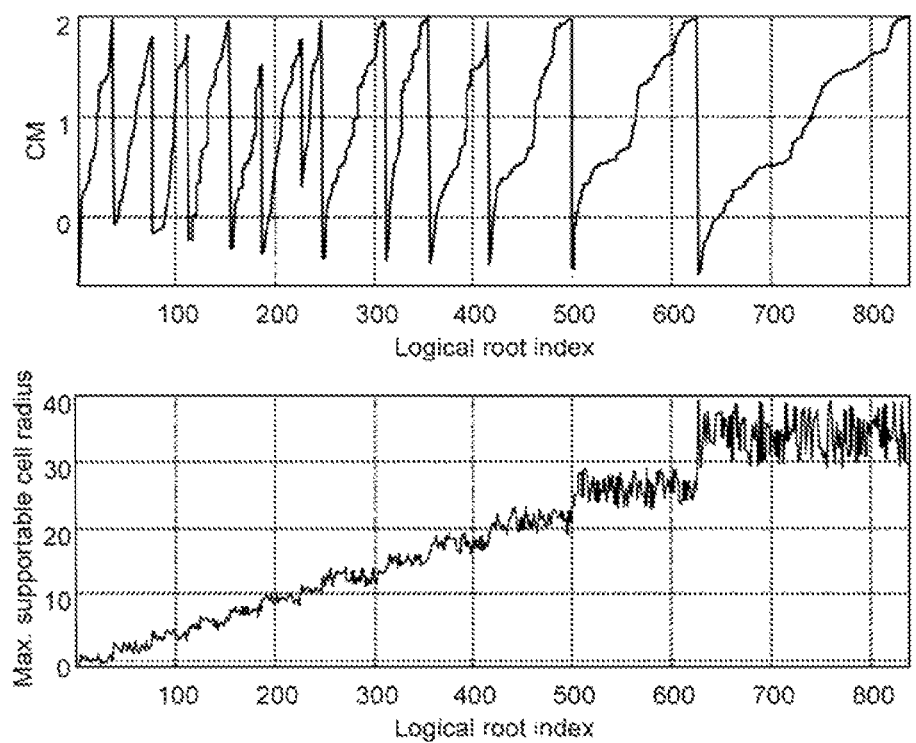

FIG. 10 is a graph showing CM characteristics and maximum supportable cell radius characteristics according to logical root indexes according to still another exemplary embodiment of the present invention. Namely, FIG. 10 shows ordering according to the maximum supportable cell radius characteristics and sections of the maximum supportable cell radius set according to particular values Ncs (predetermined cyclic shift parameters). FIG. 11 is a graph showing ordering according to CM characteristics within set sections in FIG. 10.

Referring to FIGS. 10 and 11, first, the entire indexes are ordered according to the maximum supportable cell radius and divided into sections according to the cyclic shift parameters Ncs or the maximum supportable cell radio values. The cyclic shift parameters Ncs are to obtain a cyclic shift unit supported per ZC sequence.

Table 3 shows examples of cyclic shift parameters Ncs.

TABLE 3

| Config-uration No. | No. of ZC sequence per cell (no cyclic shift restrictions) | No. of cyclic shift per ZC sequence (no cyclic shift restrictions) | Cyclic shift [samples] | Max. supportable cell radius [km] | |
|---|---|---|---|---|---|
| | | | | No guard sample | 2 guard samples |
| 1 | 1 | 64 | 13 | 1.1 | 0.8 |
| 2 | 2 | 32 | 26 | 2.9 | 2.6 |
| 3 | 3 | 22 | 38 | 4.5 | 4.2 |
| 4 | 4 | 16 | 52 | 6.5 | 6.2 |
| 5 | 5 | 13 | 64 | 8.1 | 7.8 |
| 6 | 6 | 11 | 76 | 9.8 | 9.5 |
| 7 | 7 | 10 | 83 | 10.8 | 10.5 |
| 8 | 8 | 8 | 104 | 13.7 | 13.4 |
| 9 | 10 | 7 | 119 | 15.8 | 15.5 |
| 10 | 11 | 6 | 139 | 18.6 | 18.3 |
| 11 | 13 | 5 | 167 | 22.4 | 22.1 |
| 12 | 16 | 4 | 209 | 28.3 | 28.0 |
| 13 | 22 | 3 | 279 | 38.0 | 37.7 |
| 14 | 32 | 2 | 419 | 57.4 | 57.1 |
| 15 | 64 | 1 | 0 | 115.8 | 115.5 |
| 16 | reserved | reserved | reserved | reserved | Reserved |

If the physical indexes have such characteristics as shown in FIG. 4, the entire indexes can be ordered according to the maximum supportable cell radius as shown in FIG. 9. When the sections are divided by the maximum supportable cell radius value with respect to the cyclic shift parameters Ncs, results as shown in FIG. 10 are obtained. Here, the values 'No guard sample' were used.

When the root indexes are ordered according to the CM characteristics in each divided section, results as shown in FIG. 11 are obtained. In this case, hybrid ordering that considers both the CM and the maximum supportable cell radius is applied to the mapping from the physical indexes to the logical indexes as shown in Table 4.

TABLE 4

| Logical index | Physical root index |
|---|---|
| 1~50 | 1 838 2 837 769 70 93 746 105 734 755 84 168 671 629 210 120 719 140 699 129 229 610 599 240 420 419 560 279 280 559 373 466 534 305 336 503 804 35 799 40 797 42 783 56 779 60 73 766 80 |
| 51~100 | 759 727 112 146 693 691 148 710 235 604 606 233 581 258 265 267 574 572 367 472 537 302 543 296 530 309 355 815 24 29 812 810 809 27 811 30 28 808 31 791 48 771 68 765 74 178 661 136 703 236 |
| 101~150 | 603 433 406 404 435 434 405 287 536 303 484 356 483 818 819 21 20 39 800 796 43 78 761 753 86 181 658 137 702 714 125 151 688 261 578 242 274 565 266 573 402 437 552 286 553 383 456 307 532 357 |
| 151~200 | 482 329 510 317 522 14 825 15 824 55 784 61 778 103 736 95 744 729 110 202 637 636 203 190 649 717 122 128 711 622 217 256 583 597 253 471 368 12 827 23 816 805 34 37 802 793 46 89 750 721 |
| 201~250 | 118 179 660 142 697 709 130 231 608 260 579 263 576 571 268 276 586 284 555 551 288 304 535 546 293 358 481 91 207 632 694 145 133 706 223 616 563 430 409 398 441 290 549 308 531 316 523 9 830 10 |
| 251~300 | 829 786 53 773 66 57 782 748 83 756 106 733 731 108 666 173 201 638 161 678 121 704 135 143 696 132 707 623 216 227 612 611 228 270 598 241 569 584 255 424 415 374 465 461 378 400 439 448 391 289 |
| 301~350 | 550 306 533 495 344 351 488 500 339 493 346 8 831 823 16 64 775 101 738 655 184 642 197 718 141 690 149 582 257 254 585 245 594 588 251 412 427 372 467 450 389 545 294 542 297 311 528 345 494 508 |
| 351~400 | 331 325 514 321 518 832 7 826 13 26 813 790 49 47 792 59 780 71 768 104 735 98 741 757 82 169 87 752 665 174 675 164 631 208 191 648 698 695 144 152 687 621 218 269 570 566 273 557 282 436 |
| 401~450 | 403 464 375 443 396 401 447 392 438 457 382 538 301 318 521 833 6 822 17 789 50 774 65 99 740 100 739 758 81 732 107 88 751 670 669 170 171 668 175 187 664 652 681 663 119 720 158 176 677 640 |
| 451~500 | 162 199 211 685 154 701 134 138 705 624 215 234 605 601 238 239 600 249 590 248 591 431 371 408 468 469 370 366 473 300 539 353 486 343 496 497 342 350 340 489 498 499 341 501 338 492 330 347 509 834 |

TABLE 4-continued

| Logical index | Physical root index |
|---|---|
| 501~550 | 5 33 806 788 51 785 54 777 62 764 75 762 77 743 96 97 742 673 166 172 667 163 676 185 639 654 200 114 725 650 115 189 724 194 645 195 192 657 644 647 157 182 682 156 683 628 124 715 716 123 |
| 551~600 | 700 686 627 212 139 153 213 626 150 689 221 618 615 224 602 237 244 595 596 243 564 275 561 277 278 589 250 246 417 593 422 445 394 446 442 445 394 446 442 397 393 381 458 547 292 365 474 540 299 477 364 541 362 475 |
| 601~650 | 298 359 480 527 312 313 526 525 314 487 352 327 512 513 319 326 506 332 507 348 491 520 333 322 517 836 3 4 835 828 11 19 820 18 821 817 22 25 814 32 807 36 803 798 38 801 41 44 795 52 |
| 651~700 | 787 794 45 63 776 69 772 770 67 781 58 72 767 763 94 76 745 92 747 737 102 90 749 754 85 79 760 167 672 109 730 674 165 728 111 186 653 209 679 116 630 160 723 206 635 722 204 117 633 651 |
| 701~750 | 680 188 205 159 634 641 113 193 198 726 656 646 183 180 662 659 177 196 643 155 684 214 713 625 126 692 147 712 127 708 131 219 620 220 619 617 222 613 226 225 614 230 609 607 232 262 577 580 259 575 |
| 751~800 | 264 272 567 271 568 562 587 252 421 418 416 423 247 592 426 413 414 425 411 428 281 558 376 407 463 432 410 462 429 395 377 444 283 556 369 470 554 459 285 380 440 460 379 399 291 548 449 390 363 476 |
| 801~838 | 388 455 384 451 453 386 478 387 361 454 452 385 479 544 360 295 310 529 485 354 511 328 315 524 337 490 502 349 334 505 504 335 519 324 515 320 |

A plurality of sequences are divided into a plurality of sub-groups according to predetermined cyclic shift parameters Ncs, and ordered according to CM characteristics in each sub-group. The plurality of sub-groups may be ordered according to each corresponding cyclic shift parameter. The biggest peaks (or the smallest peaks) appearing at upper portions in the graph as shown in FIG. 11 indicate root indexes having a maximum CM (or a minimum CM) in each sub-group.

Each cell may use the consecutive logical indexes through the hybrid ordering according to the cyclic shift parameters and the CM characteristics regardless of a cell size, and CM-based cell planning can be possible according to characteristics of each cell. The base station may use the smallest logical index allocated to the base station itself for the user equipment in a particular power restricted environment in each cell. For example, the base station may use the smallest logical index as a dedicated preamble for a user equipment that performs handover. In the smallest cell size interval, a supportable cell size is very small and an index having a value smaller than 0 km may exist. Such index indicates an index that cannot use the restricted cyclic shift. In addition, the sections may be further divided for a simply index allocation. In FIG. 11, the first section is divided by 0~1.1 km, but the section may be divided into smaller parts and ordered on the basis of the CM. For example, the first section may be divided into two parts of 0~500 m and 500~m~1.1 km and can be ordered on the basis of the CM.

Table 5 shows physical indexes according to Ncs-configured sections.

TABLE 5

| No | $N_{CS}$ | Logical index | Physical root index |
|---|---|---|---|
| 0 | 13 | 1~37 | 1 838 2 837 769 70 93 746 105 734 755 84 168 671 629 210 120 719 140 699 129 229 610 599 240 420 419 560 279 280 559 373 466 534 305 336 503 |
| 1 | 26 | 38~77 | 804 35 799 40 797 42 783 56 779 60 73 766 80 759 727 112 146 693 691 148 710 235 604 606 233 581 258 265 267 574 572 367 472 537 302 543 296 530 309 |
| 2 | 38 | 78~113 | 815 24 29 812 810 809 27 811 30 28 808 31 791 48 771 68 765 74 178 661 136 703 236 603 433 406 404 435 434 405 287 536 303 484 356 483 |
| 3 | 52 | 114~155 | 818 819 21 20 39 800 796 43 78 761 753 86 181 658 137 702 714 125 151 688 261 578 242 274 565 266 573 402 437 552 286 553 383 456 307 532 357 482 329 |
| 4 | 64 | 156~187 | 14 825 15 824 55 784 61 778 103 736 95 744 729 110 202 637 636 203 190 649 128 711 622 217 256 583 597 253 471 368 |
| 5 | 76 | 188~227 | 12 827 23 816 805 34 37 802 793 46 89 750 721 118 179 660 142 697 709 130 231 608 260 579 263 576 571 268 276 586 284 555 551 288 304 535 546 293 358 |
| 6 | 83 | 228~247 | 91 207 632 694 145 133 706 223 616 563 430 409 398 441 290 549 308 531 316 |
| 7 | 104 | 248~311 | 9 830 10 829 786 53 773 66 57 782 748 83 756 106 733 731 108 666 173 201 638 161 678 121 704 135 143 696 132 707 623 216 227 612 611 228 270 598 241 569 584 255 424 415 374 465 461 378 400 439 448 391 289 550 306 533 495 344 351 488 500 339 493 346 |
| 8 | 119 | 312~355 | 8 831 823 16 64 775 101 738 655 184 642 197 718 141 690 149 582 257 254 585 245 594 588 251 412 427 372 467 450 389 545 294 542 297 311 528 345 494 508 331 325 514 321 518 |
| 9 | 139 | 356~415 | 832 7 826 13 26 813 790 49 47 792 59 780 71 768 104 735 98 741 757 82 169 87 752 665 174 675 164 631 208 191 648 698 695 144 152 687 621 218 269 570 566 273 557 282 436 403 464 375 443 396 401 447 392 438 457 382 538 301 318 |
| 10 | 167 | 416~501 | 833 6 822 17 789 50 774 65 99 740 100 739 758 81 732 107 88 751 670 669 170 171 668 175 187 664 652 681 663 119 720 158 176 677 640 162 199 211 685 154 701 134 138 705 624 215 234 605 601 238 239 600 249 590 248 591 431 371 408 468 469 370 366 473 300 539 353 486 343 496 497 342 350 340 489 498 499 341 501 338 492 330 347 509 |

TABLE 5-continued

| No | $N_{CS}$ | Logical index | Physical root index |
|---|---|---|---|
| 11 | 209 | 500~625 | 834 5 33 806 788 51 785 54 777 62 764 75 762 77 743 96 97 742 673 166 172 |
|  |  |  | 667 163 676 185 639 654 200 114 725 650 115 189 724 194 645 195 192 657 644 |
|  |  |  | 647 157 182 682 156 683 628 124 715 716 123 700 686 627 212 139 153 213 626 |
|  |  |  | 150 689 221 618 615 224 602 237 244 595 596 243 564 275 561 277 278 589 250 |
|  |  |  | 246 417 593 422 445 394 446 442 397 393 381 458 547 292 365 474 540 299 477 |
|  |  |  | 364 541 362 475 298 359 480 527 312 313 526 525 314 487 352 327 512 513 319 |
|  |  |  | 326 506 332 507 348 491 520 333 322 517 |
| 12 | 279 | 626~838 | 836 3 4 835 828 11 19 820 18 821 817 22 25 814 32 807 36 803 798 38 801 |
|  |  |  | 41 44 795 52 787 794 45 63 776 69 772 770 67 781 58 72 767 763 94 76 745 |
|  |  |  | 92 747 737 102 90 749 754 85 79 760 167 672 109 730 674 165 728 111 186 653 |
|  |  |  | 209 679 116 630 160 723 206 635 722 204 117 633 651 680 188 205 159 634 641 |
|  |  |  | 113 193 198 726 656 646 183 180 662 659 177 196 643 155 684 214 713 625 126 |
|  |  |  | 692 147 712 127 708 131 219 620 220 619 617 222 613 226 225 614 230 609 607 |
|  |  |  | 232 262 577 580 259 575 264 272 567 271 568 562 587 252 421 418 416 423 247 |
|  |  |  | 592 426 413 414 425 411 428 281 558 376 407 463 432 410 462 429 395 377 444 |
|  |  |  | 283 556 369 470 554 459 285 380 440 460 379 399 291 548 449 390 363 476 388 |
|  |  |  | 455 384 451 453 386 478 387 361 454 452 385 479 544 360 295 310 529 485 354 |
|  |  |  | 511 328 315 524 337 490 502 349 334 505 504 335 519 324 515 320 516 323 |

Table 5 shows that a plurality of physical root indexes are divided into a plurality of sub-groups according to predetermined cyclic shift parameters Ncs and consecutive logical indexes are allocated in each sub-group.

With such logical indexes set, a sequence can be easily selected according to a cell size in a high mobility cell. In addition, if a cell requires low CM characteristics, it may simply select front indexes among indexes that may be used in its cell size to thus use indexes having low CM characteristics. Table 5 does not mean that only the index values (physical indexes or logical indexes) related to the Ncs are used. An index, which may be suitable for the CM characteristics of a cell, may be selectively used regardless of a cell size in a low/middle mobility cell. In addition, An Ncs section table that can be used in the low/middle mobility cell may be separately set. In this case, a table to be applied by using a discrimination signal of a cell having the low/middle mobility cell and a cell having the high mobility cell may be selected.

Figure 12:
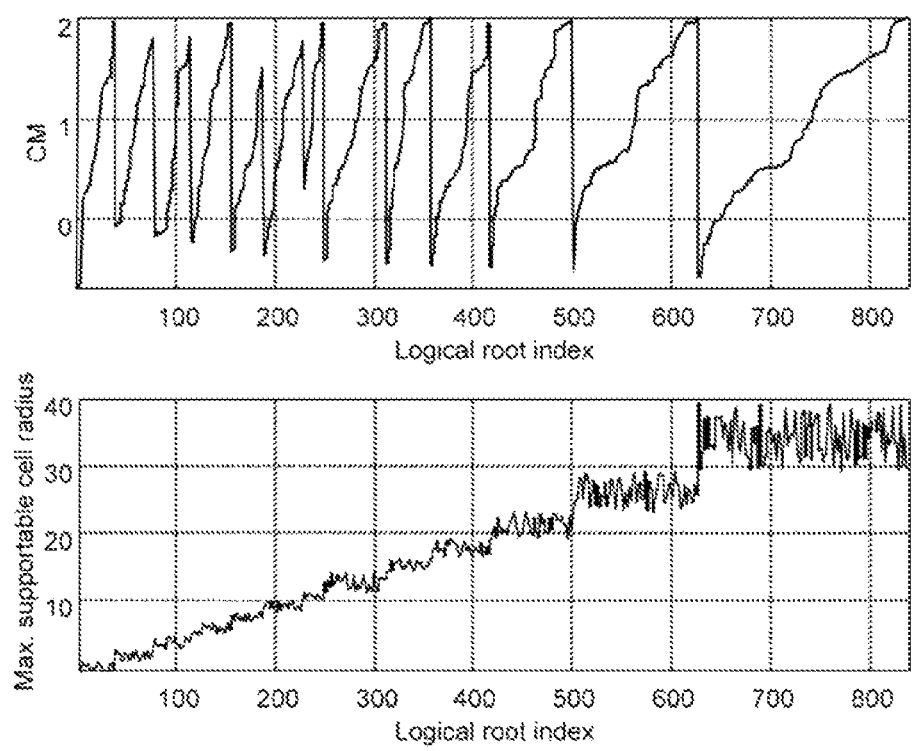

FIG. 12 is a graph showing CM characteristics and maximum supportable cell radius characteristics according to logical root indexes according to yet another exemplary embodiment of the present invention. Namely, FIG. 12 shows ordering based on the plurality of characteristics and pair allocation.

Referring to FIG. 12, ZC sequences have complex conjugate symmetry characteristics, based on which indexes having the complex conjugate symmetry can be pair-allocated consecutively.

The complex conjugate symmetry of the ZC sequences can be expressed as shown $$x_{\mu=\alpha}(k)=x_{\mu=N-\alpha}^*(k)$$ [Equation 5]

where (•)* indicates complex conjugate. The sum of two root indexes of two ZC sequences having complex conjugate symmetry is equal to the length of a ZC sequence. If only a single root index is used in a cell, such characteristics cannot be obtained, but in case of using a plurality of root indexes having complex conjugate symmetry characteristics, complexity of a detector of a receiver can be reduced to a half. The root indexes having complex conjugate symmetry characteristics can be consecutively allocated while applying the CM-based ordering, the maximum supportable cell radius-based ordering and the hybrid ordering, etc. thereto. When the indexes are pair-allocated, the base station signals only a single logical index and the user equipment naturally uses pair indexes while increasing the logical indexes as necessary.

In the above Table 5, each group includes the odd number of indexes, and in order to constitute the complex conjugate symmetry characteristics, one index of a higher group may be used by a lower group. This can be expressed as shown in Table 6.

TABLE 6

| No | $N_{CS}$ | Logical index | Physical root index |
|---|---|---|---|
| 0 | 13 | 1~37 | 1 838 2 837 769 70 93 746 105 734 755 84 168 671 629 210 120 719 140 699 |
|  |  |  | 129 710 229 610 599 240 420 419 560 279 280 559 373 466 534 305 336 503 |
| 1 | 26 | 38~77 | 804 35 799 40 797 42 783 56 779 60 73 766 80 759 727 112 146 693 691 148 |
|  |  |  | 235 604 606 233 581 258 265 574 267 572 367 472 537 302 543 296 530 309 |
| 2 | 38 | 78~113 | 815 24 29 810 812 27 809 30 811 28 808 31 791 48 771 68 765 74 178 661 |
|  |  |  | 136 703 236 603 433 406 404 435 434 405 287 552 536 303 356 483 |
| 3 | 52 | 114~155 | 818 21 819 20 39 800 796 43 78 761 753 86 181 658 137 702 714 125 151 |
|  |  |  | 688 261 578 242 597 274 565 266 573 402 437 286 553 383 456 307 532 357 |
|  |  |  | 482 329 510 317 522 |
| 4 | 64 | 156~187 | 14 825 15 824 55 784 61 778 103 736 95 744 729 110 202 637 636 203 190 |
|  |  |  | 649 717 122 128 711 622 217 256 583 253 586 471 368 |
| 5 | 76 | 188~227 | 12 827 23 816 805 34 37 802 793 46 89 750 721 118 179 660 142 697 709 |
|  |  |  | 130 231 608 260 579 263 576 571 268 276 563 284 555 551 288 304 535 546 |
| 6 | 83 | 228~247 | 748 91 207 632 694 145 133 706 223 616 430 409 398 441 290 549 308 531 |
| 7 | 104 | 248~311 | 9 830 10 829 786 53 773 66 57 782 83 756 106 733 731 108 666 173 201 638 |
|  |  |  | 161 678 718 121 704 135 143 696 132 707 623 216 227 612 611 228 270 569 |
|  |  |  | 241 598 584 255 424 415 374 465 461 378 400 439 448 391 289 550 306 533 |
|  |  |  | 495 344 351 488 500 339 493 346 |

TABLE 6-continued

| No | $N_{CS}$ | Logical index | Physical root index |
|---|---|---|---|
| 8 | 119 | 312~355 | 8 831 823 16 64 775 101 738 655 184 642 197 141 698 690 149 582 257 254 585 245 594 588 251 412 427 372 467 450 389 545 294 542 297 311 528 345 494 508 331 325 514 321 518 |
| 9 | 139 | 356~415 | 832 7 826 13 26 813 790 49 47 792 59 780 71 768 104 735 98 741 757 82 670 169 87 752 665 174 675 164 631 208 191 648 695 144 152 687 621 218 269 570 566 273 557 282 436 403 464 375 443 396 401 438 392 447 457 382 |
| 10 | 167 | 416~501 | 833 6 822 17 789 50 774 65 99 740 100 739 758 81 732 107 88 751 669 170 171 668 175 664 187 652 681 158 119 720 663 176 677 162 640 199 211 628 685 154 701 138 134 705 624 215 234 605 601 238 239 600 249 590 248 591 431 408 371 468 469 370 366 473 300 539 353 486 343 496 497 342 350 489 340 499 498 341 501 338 492 347 330 509 |
| 11 | 209 | 500~625 | 834 5 33 806 788 51 785 54 777 62 764 75 762 77 743 96 97 742 673 166 172 667 163 676 185 654 639 200 114 725 650 189 115 724 194 645 195 644 647 192 657 182 157 682 156 683 124 715 716 123 700 139 627 212 686 153 213 626 150 689 221 618 615 224 602 237 244 595 596 243 564 275 562 277 561 278 589 250 246 593 417 422 445 394 446 393 397 442 381 458 547 292 365 474 540 299 477 362 475 364 541 298 359 480 527 312 313 526 525 314 487 352 327 512 513 326 319 520 332 507 348 491 506 333 322 517 |
| 12 | 279 | 626~838 | 836 3 4 835 828 11 19 820 18 821 817 22 25 814 32 807 36 803 798 41 801 38 44 795 52 787 794 45 63 776 69 770 772 67 781 58 72 767 763 76 94 745 92 747 737 102 90 749 754 85 79 760 167 672 109 730 674 165 728 111 186 653 209 630 160 679 116 723 206 633 722 117 204 635 651 188 680 159 205 634 641 198 726 113 193 646 656 183 180 659 662 177 196 643 155 684 214 625 713 126 692 147 712 127 708 131 219 620 220 619 617 222 613 226 225 614 230 609 607 232 262 577 580 259 575 264 272 567 271 568 587 252 421 418 416 423 247 592 426 413 414 425 411 428 281 558 376 463 407 432 410 429 462 377 395 444 283 556 369 470 554 285 459 380 440 399 379 460 291 548 449 390 363 476 388 451 384 455 453 386 478 361 387 452 454 385 479 360 544 295 310 529 485 354 511 328 315 524 337 502 490 349 334 505 |

The results of constituting the complex conjugate symmetry characteristics appear to be similar to those of hybrid ordering in FIG. 11. Namely, the indexes can be ordered such that they can be pair-allocated without degrading particular characteristics of them.

Figure 13:
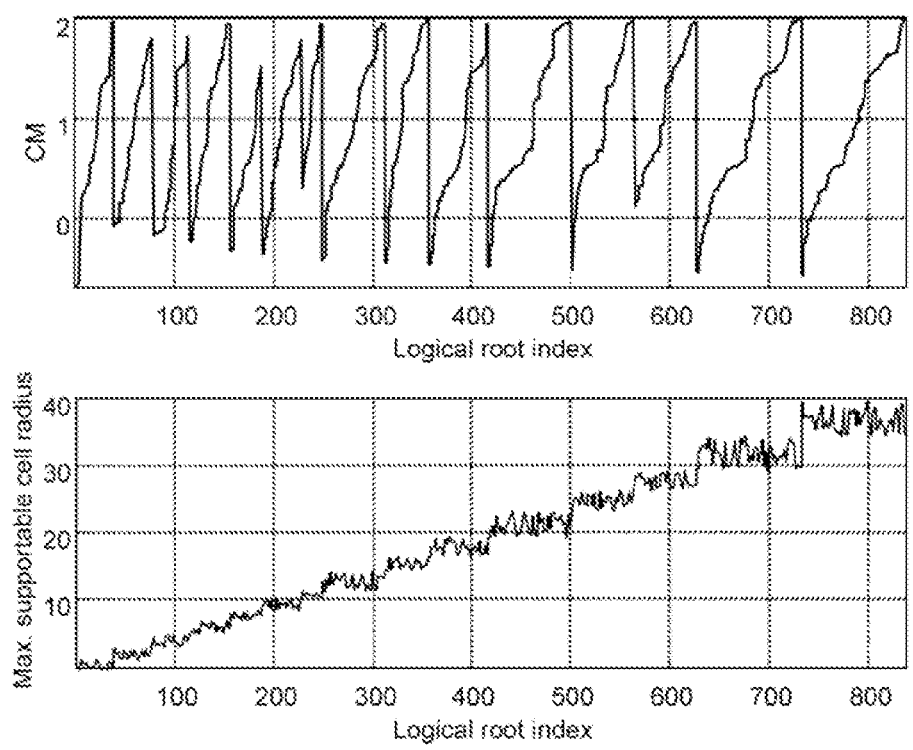

FIG. 13 is a graph showing CM characteristics and maximum supportable cell radius characteristics according to logical root indexes according to another exemplary embodiment of the present invention. Namely, FIG. 13 shows ordering based on the plurality of characteristics and pair allocation.

Referring to FIG. 13, the sections divided in FIG. 12 can be more minutely divided. For example, the sections of the configuration numbers 11 and 12 in Table 3 can be halved to use a wider maximum cell radius.

Table 7 is a mapping table showing physical indexes of respective sections when the 11-th and 12-th sections are halved.

TABLE 7

| No | $N_{CS}$ | Logical index | Physical root index |
|---|---|---|---|
| 0 | 13 | 1~37 | 1 838 2 837 769 70 93 746 105 734 755 84 168 671 629 210 120 719 140 699 129 710 229 610 599 240 420 419 560 279 280 559 373 466 534 305 336 503 |
| 1 | 26 | 38~77 | 804 35 799 40 797 42 783 56 779 60 73 766 80 759 727 112 146 693 691 148 235 604 606 233 581 258 265 574 267 572 367 472 537 302 543 296 530 309 |
| 2 | 38 | 78~113 | 815 24 29 810 812 27 809 30 811 28 808 31 791 48 771 68 765 74 178 661 136 703 236 603 433 406 404 435 434 405 287 552 536 303 356 483 |
| 3 | 52 | 114~155 | 818 21 819 20 39 800 796 43 78 761 753 86 181 658 137 702 714 125 151 688 261 578 242 597 274 565 266 573 402 437 286 553 383 456 307 532 357 482 329 510 317 522 |
| 4 | 64 | 156~187 | 14 825 15 824 55 784 61 778 103 736 95 744 729 110 202 637 636 203 190 649 717 122 128 711 622 217 256 583 253 586 471 368 |
| 5 | 76 | 188~227 | 12 827 23 816 805 34 37 802 793 46 89 750 721 118 179 660 142 697 709 130 231 608 260 579 263 576 571 268 276 563 284 555 551 288 304 535 546 |
| 6 | 83 | 228~247 | 748 91 207 632 694 145 133 706 223 616 430 409 398 441 290 549 308 531 |
| 7 | 104 | 248~311 | 9 830 10 829 786 53 773 66 57 782 83 756 106 733 731 108 666 173 201 638 161 678 718 121 704 135 143 696 132 707 623 216 227 612 611 228 270 569 241 598 584 255 424 415 374 465 461 378 400 439 448 391 289 550 306 533 495 344 351 488 500 339 493 346 |
| 8 | 119 | 312~355 | 8 831 823 16 64 775 101 738 655 184 642 197 141 698 690 149 582 257 254 585 245 594 588 251 412 427 372 467 450 389 545 294 542 297 311 528 345 494 508 331 325 514 321 518 |
| 9 | 139 | 356~415 | 832 7 826 13 26 813 790 49 47 792 59 780 71 768 104 735 98 741 757 82 670 169 87 752 665 174 675 164 631 208 191 648 695 144 152 687 621 218 269 570 566 273 557 282 436 403 464 375 443 396 401 438 392 447 457 382 |

TABLE 7-continued

| No | $N_{CS}$ | Logical index | Physical root index |
|----|----|----|----|
| 10 | 167 | 416~501 | 833 6 822 17 789 50 774 65 99 740 100 739 758 81 732 107 88 751 669 170 171 668 175 664 187 652 681 158 119 720 663 176 677 162 640 199 211 628 685 154 701 138 134 705 624 215 234 605 601 238 239 600 249 590 248 591 431 408 371 468 469 370 366 473 300 539 353 486 343 496 497 342 350 489 340 499 498 341 501 338 492 347 330 509 |
| 11 | 209 | 500~563 | 834 5 33 806 788 51 764 75 97 742 673 166 163 676 639 200 114 725 650 189 194 645 195 644 157 682 700 139 627 212 686 153 150 689 602 237 596 243 564 275 561 278 417 422 445 394 365 474 540 299 541 298 525 314 487 352 513 326 332 507 348 491 322 517 |
|    |     | 564~625 | 785 54 777 62 762 77 743 96 172 667 185 654 115 724 192 647 657 182 156 683 124 715 716 123 213 626 221 618 615 224 244 595 562 277 589 250 246 593 446 393 397 442 381 458 547 292 477 362 364 475 359 480 527 312 313 526 327 512 319 520 506 333 |
| 12 | 279 | 626~731 | 4 835 828 11 18 821 25 814 32 807 36 803 52 787 69 770 781 58 94 745 92 747 754 85 79 760 167 672 674 165 186 653 679 160 116 723 206 633 651 188 205 634 193 646 656 183 662 177 196 643 692 147 712 127 220 619 225 614 580 259 575 264 272 567 271 568 416 423 247 592 414 425 281 558 407 432 410 429 462 377 369 470 459 380 440 399 291 548 454 385 544 295 485 354 511 328 337 502 490 349 334 505 519 320 516 323 |
|    |     | 732~838 | 836 3 19 820 817 22 798 41 801 38 44 795 794 45 63 776 772 67 72 767 763 76 737 102 90 749 109 730 728 111 209 630 635 204 722 117 680 159 641 198 113 726 180 659 155 684 214 625 713 126 708 131 219 620 617 222 613 226 230 609 607 232 262 577 587 252 421 418 426 413 411 428 376 463 395 444 283 556 554 285 460 379 449 390 363 476 388 451 384 455 453 386 478 361 387 452 479 360 310 529 315 524 504 335 324 515 |

The maximum cell radius can be increased from 29.14 km to 34.15 km so as to be used by applying Table 7. Here, particular sections are halved and re-ordered, but it is merely an example. That is, the size of particular sections can be divided in various manners. For example, in order to support a particular maximum cell radius, sections may be divided based on the particular maximum cell radius. Alternatively, sections may be divided such that the number of indexes used in a particular section is doubled. Sections having a small number of indexes can be grouped into one section, to which the second ordering may be applied. In addition, a section having a large number of indexes can be divided into two (or more) sections, to which the second ordering may be applied.

Figure 14:
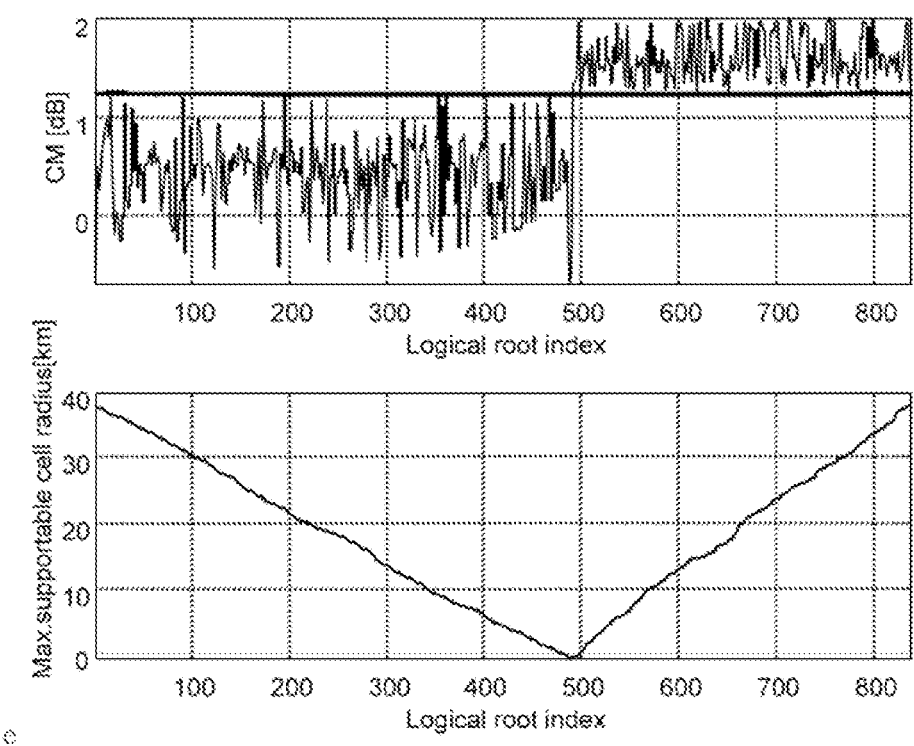

FIG. 14 is a graph showing CM characteristics and maximum supportable cell radius characteristics according to logical root indexes according to another exemplary embodiment of the present invention. Namely, FIG. 13 shows that indexes are divided into groups based on the CM characteristics and are ordered according to a maximum supportable cell size in each group.

Referring to FIG. 14, first, the indexes may be ordered according to the CM characteristics, divided into a group having a CM higher than 1.2 dB, namely, a QPSK CM, and a group having a lower CM, and then ordered according to the maximum supportable cell radius in each group. The indexes in the group having the CM lower than QPSK may be ordered according to the order that the maximum supportable cell size is reduced, and the indexes in the group having the CM higher than QPSK may be ordered in the order that the maximum supportable cell size is increased.

Table 8 is a mapping table of physical indexes by section in case where the indexes are ordered according to the CM characteristics, divided into groups based on 1.2 dB, a single CM value, and then ordered according to the maximum supportable cell size in each group.

TABLE 8

| No | Logical index | Physical root index |
|----|----|----|
| 0 | 1~50 | 3 836 209 630 76 763 180 659 126 713 219 620 226 613 131 708 262 577 72 767 22 817 44 795 41 798 19 820 38 801 232 607 67 772 45 794 90 749 230 609 111 728 222 617 102 737 204 635 109 730 |
| 1 | 51~100 | 63 776 117 722 198 641 155 684 159 680 214 625 113 726 196 643 183 656 52 787 94 745 188 651 165 674 177 662 32 807 25 814 147 692 18 821 36 803 69 770 259 580 11 828 92 747 85 754 220 619 |
| 2 | 101~150 | 206 633 79 760 205 634 225 614 127 712 58 781 116 723 160 679 193 646 186 653 167 672 4 835 77 762 224 615 221 618 62 777 124 715 54 785 96 743 192 647 172 667 156 683 115 724 185 654 213 626 |
| 3 | 151~200 | 123 716 182 657 166 673 212 627 195 644 114 725 189 650 51 788 75 764 150 689 33 806 237 602 163 676 97 742 194 645 200 639 157 682 153 686 139 700 5 834 211 628 187 652 239 600 175 664 99 740 |
| 4 | 201~250 | 215 624 154 685 171 668 199 640 158 681 170 669 138 701 50 789 100 739 107 732 17 822 234 605 81 758 162 677 134 705 88 751 176 663 65 774 119 720 238 601 6 833 169 670 152 687 49 790 98 741 |
| 5 | 251~300 | 87 752 174 665 144 695 82 757 164 675 71 768 13 826 26 813 59 780 218 621 47 792 191 648 104 735 208 631 7 832 141 698 64 775 197 642 184 655 101 738 149 690 8 831 16 823 121 718 57 782 |
| 6 | 301~350 | 108 731 216 623 161 678 173 666 201 638 53 786 106 733 9 830 228 611 83 756 66 773 132 707 143 696 135 704 227 612 10 829 91 748 133 706 145 694 223 616 207 632 179 660 34 805 23 816 46 793 |

TABLE 8-continued

| No | Logical index | Physical root index |
|---|---|---|
| 7 | 351~400 | 130 709 260 579 12 827 231 608 37 802 263 576 89 750 142 697 118 721 203 636 55 784 110 729 14 825 128 711 217 622 103 736 15 824 61 778 122 717 202 637 95 744 190 649 181 658 151 688 137 702 |
| 8 | 401~450 | 125 714 261 578 39 800 78 761 20 819 21 818 43 796 86 753 68 771 136 703 24 815 48 791 74 765 178 661 236 603 27 812 28 811 29 810 30 809 31 808 235 604 35 804 73 766 146 693 40 799 |
| 9 | 451~500 | 80 759 42 797 233 606 148 691 56 783 112 727 60 779 129 710 258 581 70 769 229 610 84 755 93 746 105 734 120 719 140 699 168 671 210 629 1 838 2 837 419 420 279 560 280 559 336 503 240 599 |
| 10 | 501~550 | 373 466 305 534 367 472 296 543 265 574 309 530 267 572 302 537 355 484 404 435 405 434 406 433 356 483 303 536 287 552 266 573 307 532 286 553 317 522 383 456 357 482 402 437 274 565 329 510 242 597 |
| 11 | 551~600 | 368 471 256 583 253 586 293 546 284 555 288 551 304 535 268 571 358 481 276 563 316 523 398 441 308 531 409 430 290 549 374 465 306 533 400 439 270 569 289 550 378 461 415 424 241 598 346 493 351 488 |
| 12 | 601~650 | 339 500 344 495 255 584 391 448 372 467 345 494 254 585 331 508 389 450 257 582 325 514 412 427 245 594 297 542 321 518 311 528 251 588 294 545 282 557 392 447 382 457 318 521 396 443 273 566 403 436 |
| 13 | 651~700 | 269 570 301 538 375 464 401 438 338 501 408 431 371 468 366 473 330 509 340 499 249 590 341 498 342 497 248 591 343 496 370 469 347 492 350 489 353 486 300 539 417 422 278 561 314 525 352 487 326 513 |
| 14 | 701~750 | 348 491 365 474 275 564 394 445 243 596 298 541 322 517 332 507 299 540 364 475 393 446 246 593 319 520 313 526 333 506 327 512 244 595 362 477 250 589 312 527 292 547 397 442 381 458 359 480 277 562 |
| 15 | 751~800 | 281 558 334 505 323 516 247 592 320 519 369 470 272 567 295 544 410 429 291 548 380 459 399 440 271 568 377 462 414 425 385 454 264 575 407 432 354 485 349 490 337 502 416 423 328 511 363 476 324 515 |
| 16 | 801~838 | 411 428 310 529 361 478 283 556 388 451 390 449 413 426 379 460 384 455 285 554 386 453 376 463 387 452 252 587 395 444 360 479 315 524 335 504 418 421 |

<Comparison with a Reuse Factor in a Large cell>

Figure 15:
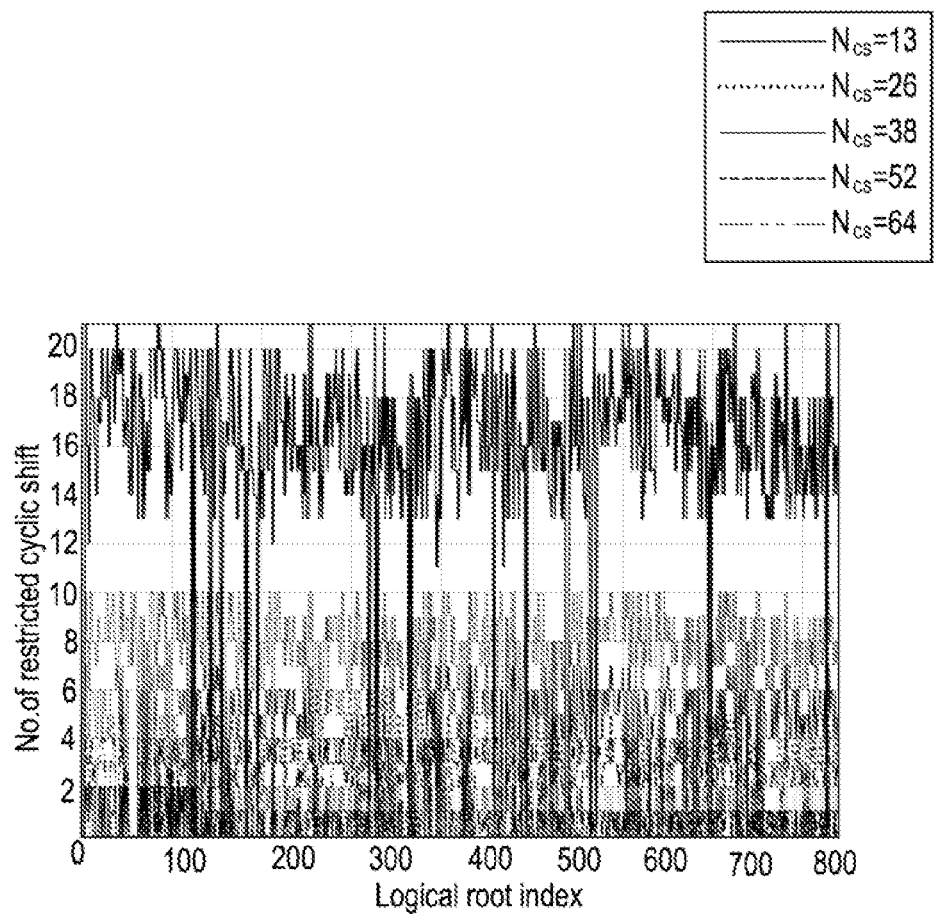
FIG. 15 is a graph showing the number of restricted cyclic shifts that can be used per logical root index according to Ncs with respect to CM mapping according to one exemplary embodiment of the present invention.
Figure 16:
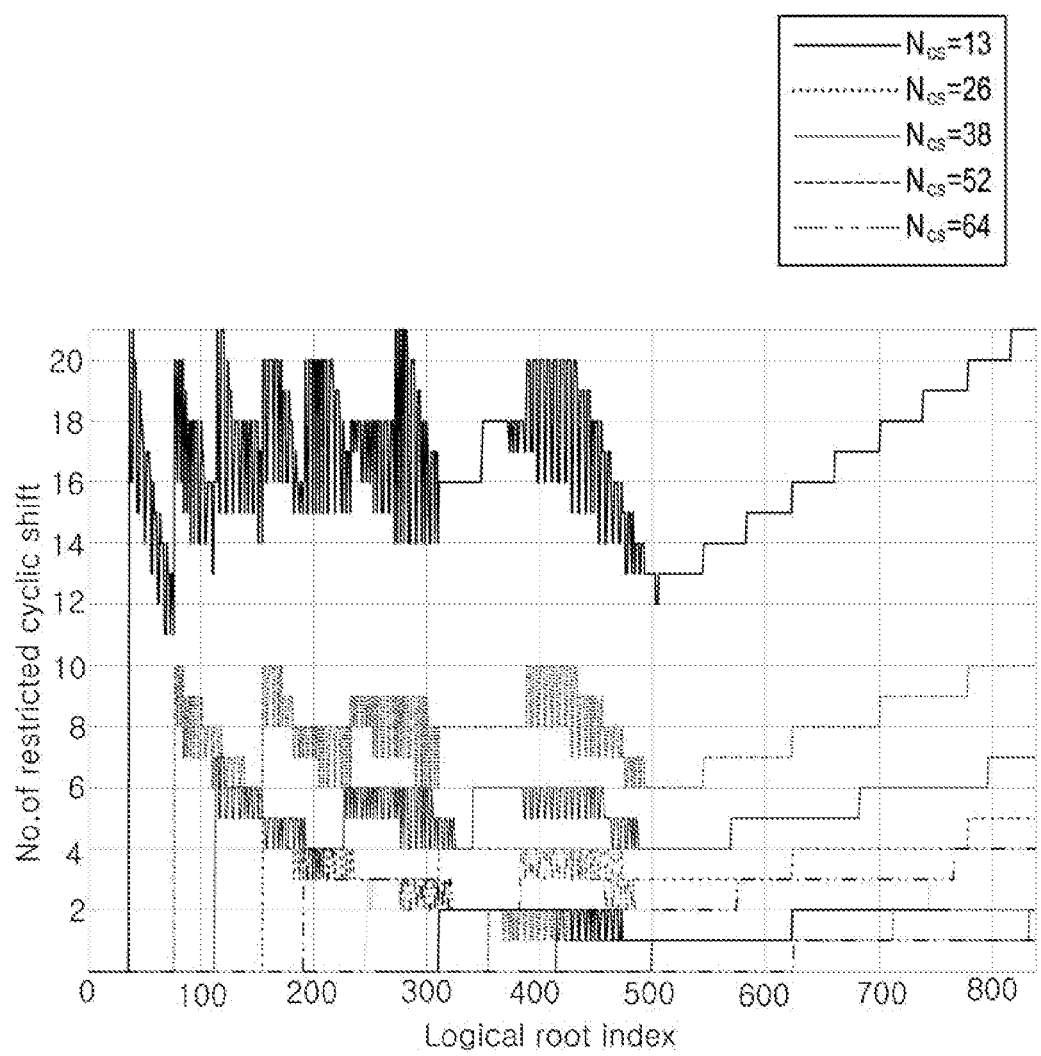
FIG. 16 is a graph showing the number of restricted cyclic shifts that can be used per logical root index according to Ncs with respect to maximum supportable cell size mapping according to one exemplary embodiment of the present invention.
Figure 17:
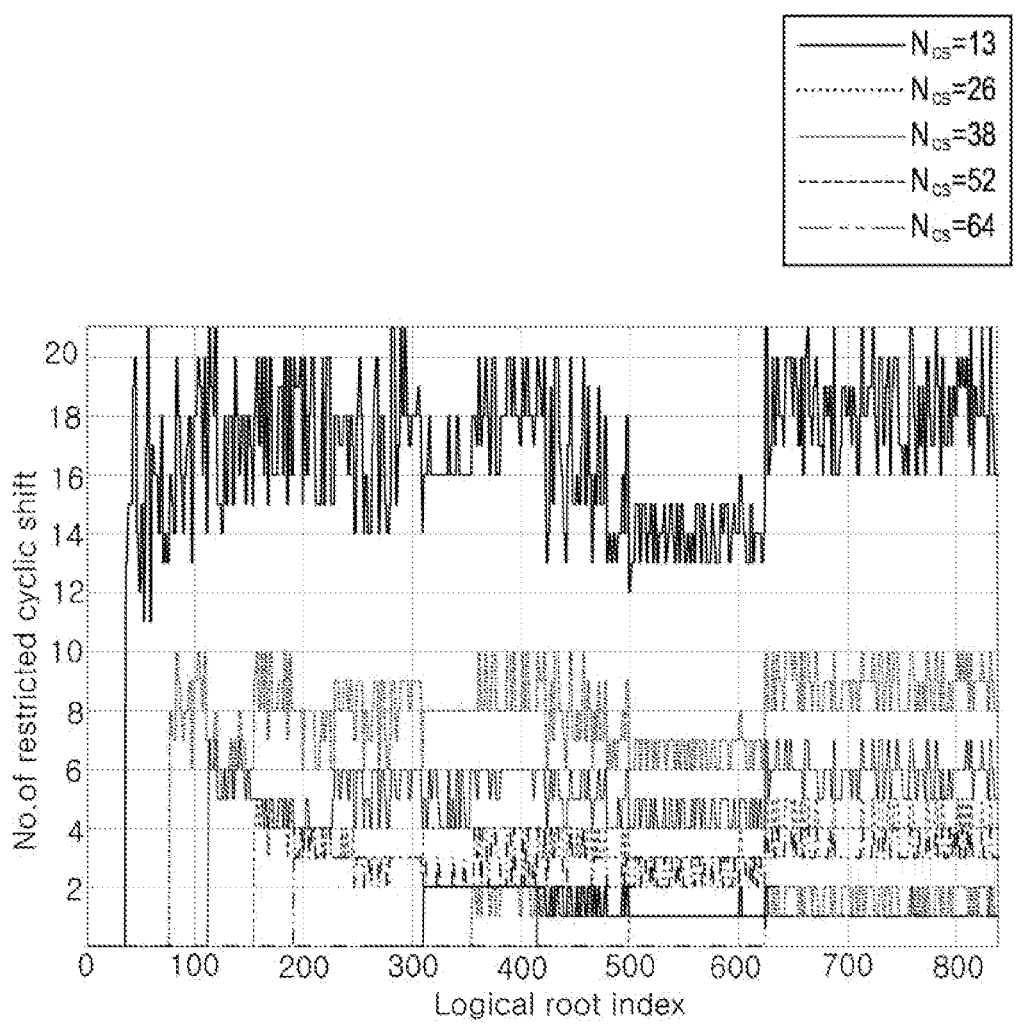
FIG. 17 is a graph showing the number of restricted cyclic shifts that can be used per logical root index according to Ncs with respect to hybrid mapping according to one exemplary embodiment of the present invention.

FIG. 15 is a graph showing the number of restricted cyclic shifts available per logical index according to an Ncs with respect to CM mapping according to one exemplary embodiment of the present invention. FIG. 16 is a graph showing the number of restricted cyclic shifts available per logical index according to the Ncs with respect to maximum supportable cell size mapping according to one exemplary embodiment of the present invention. FIG. 17 is a graph showing the number of restricted cyclic shifts available per logical index according to the Ncs with respect to hybrid mapping according to one exemplary embodiment of the present invention.

Referring to FIGS. 15 to 17, compared with the CM mapping, the maximum supportable cell size mapping and the hybrid mapping may use consecutive indexes in a high speed cell. For example, it is assumed that there are twenty cells, the cyclic shift parameter Ncs of a first cell is 13, the Ncs of the subsequent two cells (i.e., second and third cells) are 26, those of the subsequent three cells are 38, those of the subsequent four cells are 38, those of the subsequent four cells are 52, and those of the subsequent four cells are 64. In this case, pair index allocation is applied to each mapping. The Ncs indicates the number of cyclic shifts according to cell sizes. Referring to FIG. 13, it is noted that a middle portion is 0 and any available restricted cyclic shift does not appear. On the contrary, Referring to FIGS. 15 and 16, any available restricted cyclic shift does not appear. Namely, the consecutive indexes cannot be used in the CM mapping but can be used in the maximum supportable cell size mapping and hybrid mapping.

Figure 18:
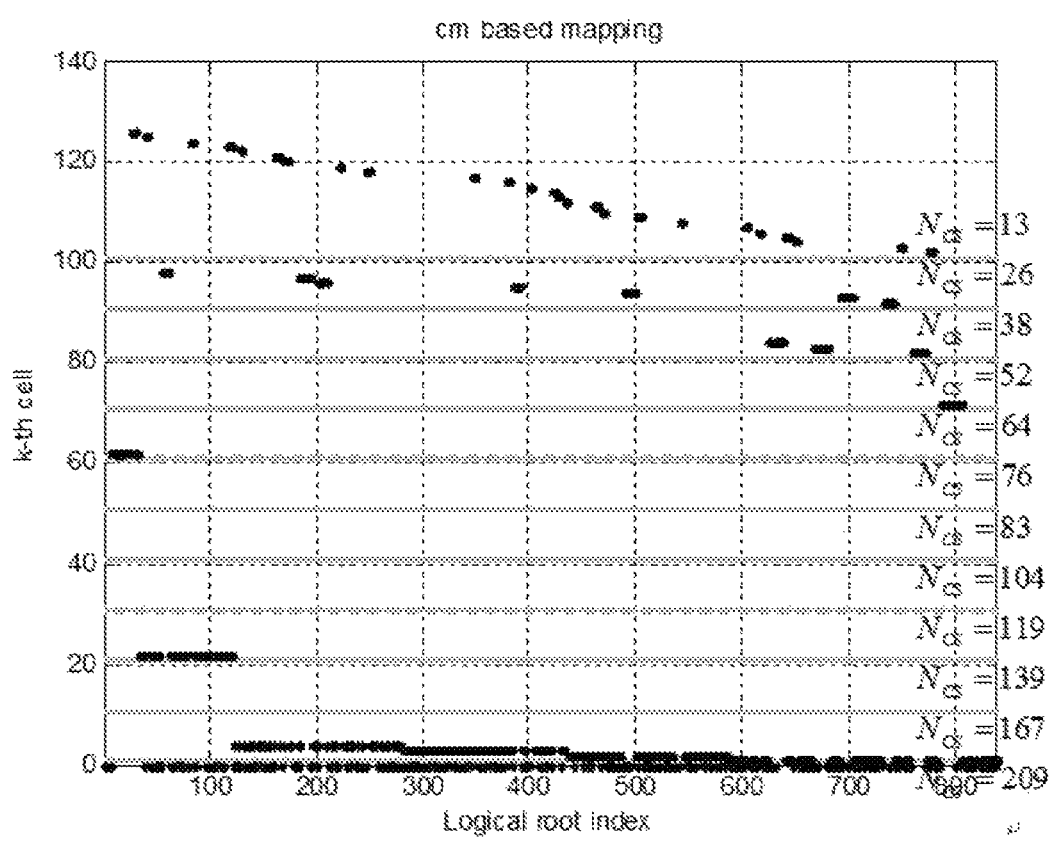
FIG. 18 is a graph showing examples of logical root indexes allocated to cells with respect to CM mapping according to one exemplary embodiment of the present invention.
Figure 19:
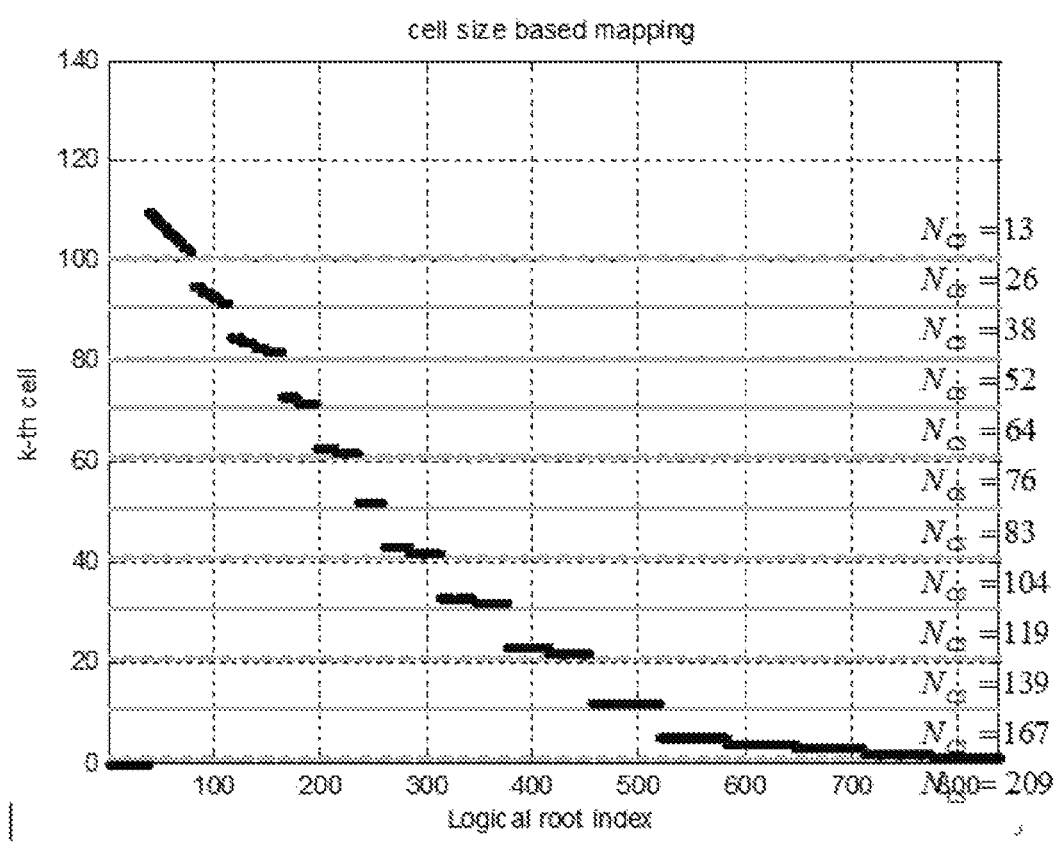
FIG. 19 is a graph showing examples of logical root indexes allocated to cells with respect to maximum supportable cell size mapping according to one exemplary embodiment of the present invention.
Figure 20:
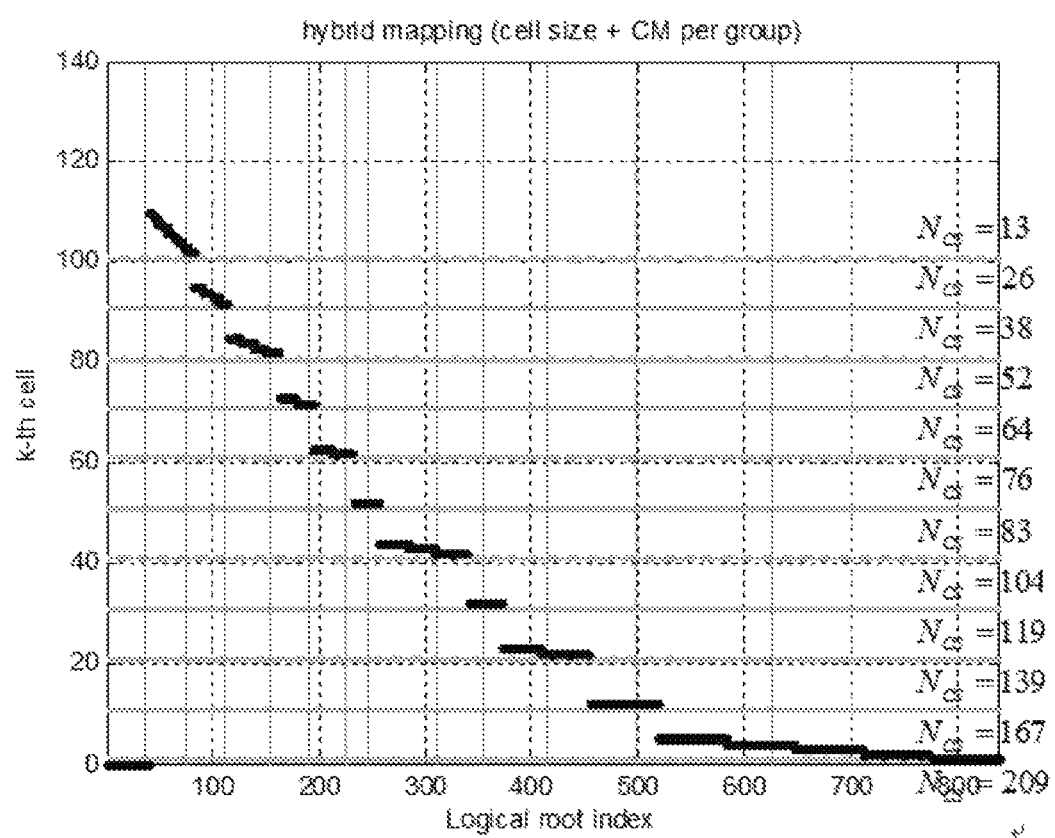
FIG. 20 is a graph showing examples of logical root indexes allocated to cells with respect to maximum supportable cell size mapping according to one exemplary embodiment of the present invention.

FIG. 18 is a graph showing examples of logical root indexes allocated to cells with respect to the CM mapping according to one exemplary embodiment of the present invention. FIG. 19 is a graph showing examples of logical root indexes allocated to cells with respect to the maximum supportable cell size mapping according to one exemplary embodiment of the present invention. FIG. 20 is a graph showing examples of logical root indexes allocated to cells with respect to the maximum supportable cell size mapping according to one exemplary embodiment of the present invention. Namely, FIGS. 18 to 20 show which indexes are allocated to cells based on the assumption in FIGS. 15 to 17.

Referring to FIGS. 18 to 20, it is assumed that every cell has high speed mobility. Referring to FIG. 18, it is noted that consecutive indexes are not used in a large cell. In comparison, Referring to FIGS. 19 and 20, it is noted that consecutive indexes can be used in a large cell. In FIGS. 19 and 20, if a cell has the Ncs of 209 (Ncs=209), four cells having the Ncs of 167 (Ncs=167) can be constructed. The reason is because, in FIG. 18, consecutive indexes cannot be used. More importantly, in FIG. 18, it is noted that, if a cell has the Ncs of 209 and three cells have the Ncs of 167, any of cells having NCS=139, Ncs=104, Ncs=83, and Ncs=76 cannot be constructed. In comparison, in FIGS. 19 and 20, cells of various sizes can be constructed. Also, in FIG. 18, it is noted that a plurality of indexes has a value 0 at the y axis and are not used in a high mobility cell. If those indexes can be used when the high mobility cell is mixed with only a low mobility cell, but such indexes drastically degrade the cell construction capabilities. Thus, failing to use the consecutive indexes much degrades the re-use factor when a plurality of large cells exists. That is, by using the consecutive indexes, a different cell may use an extra space. The use of the consecutive indexes may not make much difference in a network including only small cells, but as far as a network including a plurality of large cells concerned, the support of the use of the consecutive indexes can increase the re-use factor. FIGS. 18 to 20 consider the case where every cell has high speed mobility, but even in a case where cells having low speed mobility or middle speed mobility exist, the re-use factor is restricted if the consecutive indexes are not used for the same reasons. Also, if the consecutive indexes are used in a cell having low speed mobility or middle speed mobility, the re-use factor of the cell having high speed mobility is further restricted.

The accurate indexes of each mapping as used are as shown in Table 9, Table 10, and Table 11. Table 9 shows the indexes used for the CM mapping, Table 10 shows indexes used for the maximum support cell size mapping, and Table 11 shows the indexes used for the hybrid mapping. In Table 9 and Table 10, physical root indexes with respect to logical indexes 1 to 838 are arranged in sequence.

TABLE 9

| Logical index | Physical root index |
|---|---|
| 1~838 | 1 838 2 837 3 836 4 835 5 834 6 833 7 832 8 831 9 830 10 829 11 828 12 827 13 826 14 825 15 824 16 823 17 822 19 820 18 821 21 818 20 819 23 816 22 817 26 813 24 815 25 814 29 810 27 812 30 809 28 811 31 808 34 805 35 804 32 807 33 806 40 799 36 803 42 797 41 798 38 801 37 802 39 800 43 796 49 790 44 795 50 789 52 787 51 788 46 793 48 791 47 792 53 786 45 794 64 775 65 774 54 785 55 784 63 776 56 783 69 770 70 769 60 779 67 772 66 773 68 771 59 780 61 778 62 777 57 782 58 781 71 768 93 746 72 767 75 764 104 735 76 763 94 745 105 734 73 766 92 747 103 736 74 765 95 744 102 737 101 738 91 748 99 740 90 749 77 762 98 741 84 755 96 743 100 739 82 757 78 761 83 756 106 733 168 671 85 754 86 753 97 742 89 750 81 758 107 732 88 751 80 759 79 760 167 672 169 670 87 752 108 731 170 669 166 673 109 730 171 668 165 674 172 667 111 728 174 665 186 653 110 729 164 675 175 664 187 652 173 666 163 676 209 630 160 679 112 727 116 723 185 654 208 631 200 639 184 655 207 632 118 721 206 633 204 635 117 722 188 651 201 638 159 680 205 634 158 681 119 720 176 663 114 725 161 678 189 650 198 641 113 726 115 724 202 637 193 646 162 677 194 645 203 636 199 640 183 656 210 629 197 642 195 644 120 719 192 647 180 659 190 649 182 657 179 660 177 662 191 648 157 682 196 643 181 658 178 661 121 718 156 683 122 717 211 628 154 685 124 715 123 716 140 699 155 684 145 694 135 704 139 700 137 702 212 627 153 686 141 698 138 701 134 705 125 714 144 695 142 697 143 696 146 693 213 626 136 703 133 706 152 687 151 688 214 625 126 713 128 11 147 692 132 707 215 624 127 712 150 689 130 709 148 691 149 690 129 710 216 623 131 708 217 622 218 621 219 620 220 619 223 616 221 618 227 617 224 615 226 613 227 612 225 614 228 611 229 610 230 609 231 608 236 603 232 607 235 604 233 606 234 605 237 602 238 601 262 577 261 578 239 600 260 579 259 580 258 581 263 576 257 582 240 599 269 570 256 583 268 571 241 598 264 575 270 569 272 567 242 597 274 565 244 595 273 566 243 596 265 574 275 564 267 572 276 563 271 568 255 584 277 562 278 561 419 420 266 573 253 586 279 560 254 585 252 587 245 594 418 421 250 589 251 588 249 590 246 593 417 422 416 423 280 559 248 591 415 424 247 592 373 466 413 426 414 425 412 427 411 428 281 558 374 465 376 463 409 430 407 432 372 467 410 429 282 557 377 462 403 436 375 464 406 433 395 444 408 431 283 556 402 437 371 468 404 435 396 443 369 470 394 445 368 471 378 461 397 442 405 434 393 446 284 555 370 469 401 438 392 447 285 554 398 441 367 472 380 459 400 439 287 552 286 553 399 440 379 460 381 458 288 551 291 548 391 448 290 549 302 537 366 473 292 547 289 550 382 457 303 536 383 456 390 449 365 474 304 535 363 476 300 539 293 546 305 534 301 538 299 540 389 450 362 477 364 475 384 455 388 451 298 541 386 453 361 478 387 452 385 454 294 545 360 479 297 542 295 544 296 543 306 533 307 532 308 531 309 530 359 480 358 481 310 529 357 482 312 527 355 484 311 528 354 485 356 483 313 526 314 525 353 486 352 487 343 496 344 495 351 488 342 497 328 511 345 494 329 510 327 512 315 524 350 489 340 499 341 498 318 521 339 500 316 523 326 513 346 493 338 501 331 508 317 522 319 520 332 507 337 502 333 506 348 491 349 490 325 514 347 492 330 509 334 505 336 503 335 504 321 518 324 515 320 519 322 517 323 516 |

TABLE 10

| Logical index | Physical root index |
|---|---|
| 1~838 | 1 838 2 837 419 420 279 560 280 559 210 629 168 671 336 503 140 699 120 719 240 599 105 734 93 746 373 466 84 755 229 610 305 534 70 769 129 710 258 581 60 779 56 783 112 727 367 472 148 691 296 543 233 606 265 574 309 530 42 797 40 799 80 759 267 572 73 766 146 693 35 804 235 604 302 537 355 484 31 808 404 435 30 809 29 810 405 434 28 811 27 812 406 433 236 603 178 661 356 483 74 765 24 815 48 791 303 536 68 771 136 703 287 552 43 796 86 753 21 818 266 573 307 532 20 819 39 800 78 761 286 553 261 578 317 522 383 456 125 714 357 482 402 437 137 702 274 565 151 688 181 658 329 510 242 597 95 744 190 649 202 637 61 778 122 717 15 824 103 736 368 471 217 622 128 711 256 583 14 825 55 784 110 729 203 636 253 586 293 546 118 721 142 697 284 555 89 750 263 576 288 551 37 802 231 608 304 535 12 827 130 709 260 579 268 571 23 816 46 793 34 805 179 660 358 481 276 563 207 632 316 523 398 441 223 616 308 531 409 430 145 694 290 549 133 706 91 748 374 465 10 829 227 612 306 533 400 439 135 704 270 569 143 696 66 773 132 707 289 550 83 756 378 461 228 611 9 830 415 424 241 598 53 786 106 733 201 638 173 666 346 493 351 488 161 678 339 500 344 495 108 731 216 623 255 584 57 782 391 448 121 718 8 831 16 823 372 467 149 690 345 494 101 738 254 585 331 508 389 450 257 582 325 514 412 427 245 594 297 542 184 655 197 642 321 518 311 |

TABLE 10-continued

| Logical index | Physical root index |
|---|---|
| | 528 251 588 294 545 64 775 141 698 282 557 7 832 104 735 208 631 392 447 |
| | 191 648 382 457 318 521 47 792 396 443 273 566 218 621 403 436 59 780 13 |
| | 826 26 813 71 768 269 570 301 538 375 464 82 757 164 675 144 695 87 752 174 |
| | 665 401 438 49 790 98 741 152 687 169 670 338 501 6 833 119 720 238 601 65 |
| | 774 88 751 176 663 134 705 81 758 162 677 408 431 234 605 371 468 17 822 |
| | 107 732 366 473 330 509 50 789 100 739 138 701 170 669 340 499 158 681 249 |
| | 590 341 498 199 640 171 668 342 497 154 685 248 591 343 496 215 624 99 740 |
| | 370 469 347 492 175 664 350 489 353 486 239 600 300 539 187 652 211 628 417 |
| | 422 5 834 139 700 278 561 153 686 157 682 314 525 200 639 97 742 194 645 |
| | 352 487 163 676 326 513 348 491 237 602 365 474 33 806 75 764 150 689 275 |
| | 564 51 788 394 445 189 650 243 596 298 541 114 725 195 644 322 517 212 627 |
| | 166 673 332 507 299 540 182 657 364 475 393 446 123 716 246 593 319 520 213 |
| | 626 313 526 333 506 185 654 327 512 244 595 115 724 362 477 250 589 156 683 |
| | 312 527 172 667 96 743 192 647 54 785 62 777 124 715 292 547 221 618 397 |
| | 442 224 615 77 762 381 458 359 480 277 562 281 558 4 835 167 672 334 505 |
| | 186 653 193 646 323 516 247 592 160 679 320 519 369 470 58 781 116 723 127 |
| | 712 272 567 295 544 225 614 205 634 410 429 291 548 79 760 380 459 206 633 |
| | 220 619 399 440 271 568 85 754 377 462 92 747 11 828 414 425 259 580 69 770 |
| | 385 454 264 575 18 821 36 803 147 692 25 814 407 432 32 807 177 662 354 485 |
| | 349 490 165 674 337 502 416 423 94 745 188 651 52 787 183 656 328 511 196 |
| | 643 113 726 363 476 324 515 214 625 411 428 159 680 155 684 310 529 198 641 |
| | 117 722 361 478 283 556 63 776 388 451 109 730 102 737 204 635 390 449 111 |
| | 728 222 617 413 426 230 609 379 460 384 455 45 794 90 749 285 554 67 772 |
| | 386 453 232 607 19 820 38 801 41 798 22 817 44 795 72 767 131 708 262 577 |
| | 376 463 226 613 387 452 219 620 126 713 252 587 395 444 180 659 360 479 76 |
| | 763 209 630 315 524 335 504 3 836 418 421 |

TABLE 11

| No | $N_{CS}$ | Logical index | Physical root index |
|---|---|---|---|
| 0 | 13 | 1~36 | 1 838 2 837 70 769 93 746 105 734 84 755 168 671 210 629 120 719 140 699 229 610 240 599 419 420 279 560 280 559 373 466 305 534 336 503 |
| 1 | 26 | 37~76 | 35 804 40 799 42 797 56 783 60 779 73 766 80 759 112 727 146 693 148 691 129 710 235 604 233 606 258 581 265 574 267 572 367 472 302 537 296 543 309 530 |
| 2 | 38 | 77~112 | 24 815 29 810 27 812 30 809 28 811 31 808 48 791 68 771 74 765 178 661 136 703 236 603 406 433 404 435 405 434 303 536 355 484 356 483 |
| 3 | 52 | 113~154 | 21 818 20 819 39 800 43 796 78 761 86 753 181 658 137 702 125 714 151 688 261 578 274 565 266 573 402 437 287 552 286 553 383 456 307 532 357 482 329 510 317 522 |
| 4 | 64 | 155~190 | 14 825 15 824 55 784 61 778 103 736 95 744 110 729 202 637 203 636 190 649 122 717 128 711 217 622 256 583 242 597 253 586 368 471 293 546 |
| 5 | 76 | 191~226 | 12 827 23 816 34 805 37 802 46 793 89 750 118 721 179 660 142 697 130 709 231 608 260 579 263 576 268 571 284 555 288 551 304 535 358 481 |
| 6 | 83 | 227~246 | 207 632 145 694 133 706 223 616 276 563 409 430 398 441 290 549 308 531 316 523 |
| 7 | 104 | 247~310 | 9 830 10 829 53 786 66 773 57 782 91 748 83 756 106 733 108 731 173 666 201 638 161 678 135 704 143 696 132 707 216 623 227 612 228 611 241 598 270 569 255 584 415 424 374 465 378 461 400 439 391 448 289 550 306 533 344 495 351 488 339 500 346 493 |
| 8 | 119 | 311~354 | 8 831 16 823 64 775 101 738 184 655 197 642 121 718 149 690 257 582 254 585 245 594 251 588 412 427 372 467 389 450 294 545 297 542 311 528 345 494 331 508 325 514 321 518 |
| 9 | 139 | 355~414 | 7 832 13 826 26 813 49 790 47 792 59 780 71 768 104 735 98 741 82 757 87 752 174 665 164 675 208 631 191 648 141 698 144 695 152 687 218 621 269 570 273 566 282 557 403 436 375 464 396 443 401 438 392 447 382 457 301 538 318 521 |
| 10 | 167 | 415~498 | 6 833 17 822 50 789 65 774 99 740 100 739 81 758 107 732 88 751 169 670 170 669 171 668 175 664 187 652 158 681 119 720 176 663 162 677 199 640 154 685 138 701 134 705 215 624 234 605 238 601 239 600 249 590 248 591 408 431 371 468 370 469 366 473 300 539 353 486 343 496 342 497 350 489 340 499 341 498 338 501 347 492 330 509 |
| 11 | 209 | 499~624 | 5 834 33 806 51 788 54 785 62 777 75 764 77 762 96 743 97 742 166 673 172 667 163 676 185 654 200 639 114 725 189 650 115 724 194 645 195 644 192 647 182 657 157 682 156 683 211 628 124 715 123 716 139 700 212 627 153 686 213 626 150 689 221 618 224 615 237 602 244 595 243 596 275 564 278 561 250 589 246 593 417 422 |

TABLE 11-continued

| No | $N_{CS}$ | Logical index | Physical root index |
|---|---|---|---|
| | | | 394 445 397 442 393 446 381 458 292 547 365 474 299 540 362 477 |
| | | | 364 475 298 541 359 480 312 527 313 526 314 525 352 487 327 512 |
| | | | 326 513 319 520 332 507 333 506 348 491 322 517 |
| 12 | 279 | 625~838 | 3 836 4 835 11 828 19 820 18 821 22 817 25 814 32 807 36 803 41 |
| | | | 798 38 801 44 795 52 787 45 794 63 776 69 770 67 772 58 781 72 |
| | | | 767 76 763 94 745 92 747 102 737 90 749 85 754 79 760 167 672 |
| | | | 109 730 165 674 111 728 186 653 209 630 160 679 116 723 206 633 |
| | | | 204 635 117 722 188 651 159 680 205 634 198 641 113 726 193 646 |
| | | | 183 656 180 659 177 662 196 643 155 684 214 625 126 713 147 692 |
| | | | 127 712 131 708 219 620 220 619 222 617 226 613 225 614 230 609 |
| | | | 232 607 262 577 259 580 264 575 272 567 271 568 277 562 252 587 |
| | | | 418 421 416 423 247 592 413 426 414 425 411 428 281 558 376 463 |
| | | | 407 432 410 429 377 462 395 444 283 556 369 470 285 554 380 459 |
| | | | 399 440 379 460 291 548 390 449 363 476 384 455 388 451 386 453 |
| | | | 361 478 387 452 385 454 360 479 295 544 310 529 354 485 328 511 |
| | | | 315 524 337 502 349 490 334 505 335 504 324 515 320 519 323 516 |

<Supportable Cell Size Ordering and CM Classification>

Figure 21:
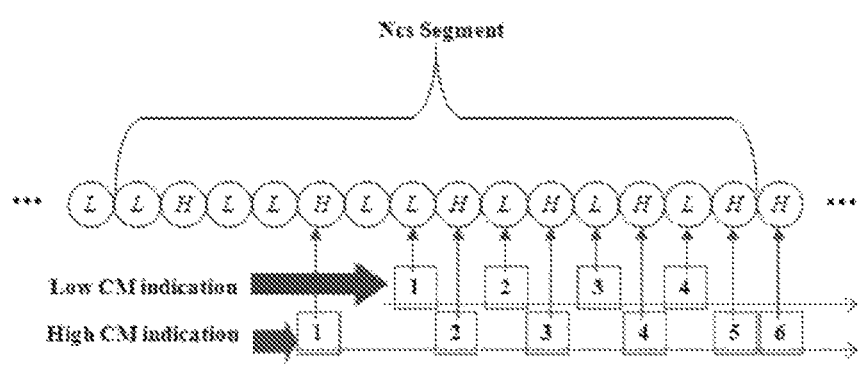
FIG. 21 is a view illustrating a method of searching logical root indexes according to CM characteristics according to one exemplary embodiment of the present invention.
Figure 22:
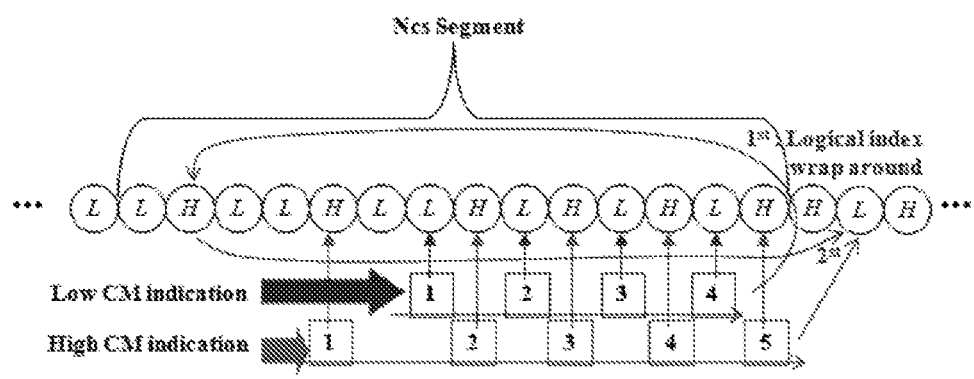
FIG. 22 is a view illustrating a method of searching logical root indexes according to CM characteristics according to another exemplary embodiment of the present invention.
Figure 23:
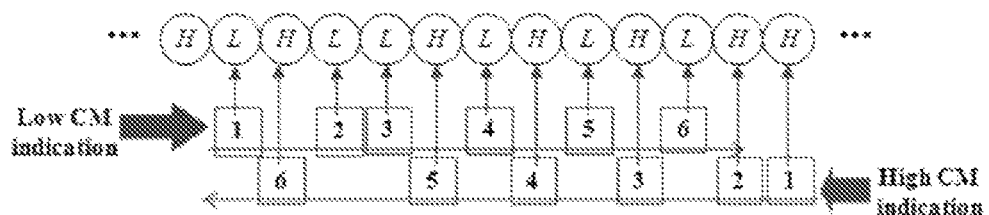
FIG. 23 is a view illustrating a method of searching logical root indexes according to CM characteristics according to still another exemplary embodiment of the present invention.

FIG. 21 is a view illustrating a method of searching logical root indexes according to the CM characteristics according to one exemplary embodiment of the present invention. FIG. 22 is a view illustrating a method of searching logical root indexes according to the CM characteristics according to another exemplary embodiment of the present invention. FIG. 23 is a view illustrating a method of searching logical root indexes according to the CM characteristics according to still another exemplary embodiment of the present invention.

Referring to FIGS. 21 to 23, the physical indexes are first ordered according to a supportable cell size. Thereafter, a method of using available indexes in each cell vary according to characteristics of a single transmitted index. Allocation of logical indexes may be formed according to one logical index+Ncs. It can be performed by the following two methods.

In one method, each cell uses only a single sequence class (See FIG. 20). It is divided into a low CM index and a high CM index.

If a transmitted logical index has CM characteristics which are lower than or the same as the QPSK CM (1.2 dB) of the SC-FDMA, the closest adjacent logical indexes having the CM characteristics which are lower than or the same as the QPSK CM of the SC-FDMA are searched and used in sequence. If a transmitted logical index has CM characteristics which are higher than the QPSK CM of the SC-FDMA, the closest adjacent logical indexes having the CM characteristics which are higher than the QPSK CM of the SC-FDMA are searched and used in sequence.

In another method, a single cell may use either sequence class (lower CM or higher CM) (See FIGS. 20 and 21). It is divided into a lower CM index, a higher CM index and a mixed CM index.

If a transmitted logical index has CM characteristics which are lower than or the same as the QPSK CM (1.2 dB) of the SC-FDMA, the closest adjacent logical indexes having the CM characteristics which are lower than or the same as the QPSK CM of the SC-FDMA are searched and used in sequence. In this case, when it reaches the end of an Ncs segment, the index is reset as an index having a first higher CM of a next Ncs segment. If a transmitted logical index has CM characteristics which are higher than the QPSK CM (1.2 dB) of the SC-FDMA, the closest adjacent logical indexes having the CM characteristics which are higher than the QPSK CM of the SC-FDMA are searched and used in sequence. In this case, if it reaches the end of an Ncs segment, the index is reset as an index having a first lower CM of a next Ncs segment.

The directions (+/−, direction in which indexes are increased/decreased) for searching indexes having the same characteristics may be the same or different. The direction for searching indexes does not affect the proposed technique, like the ordering direction (ascent/descent) of indexes as mentioned above.

Figure 24:
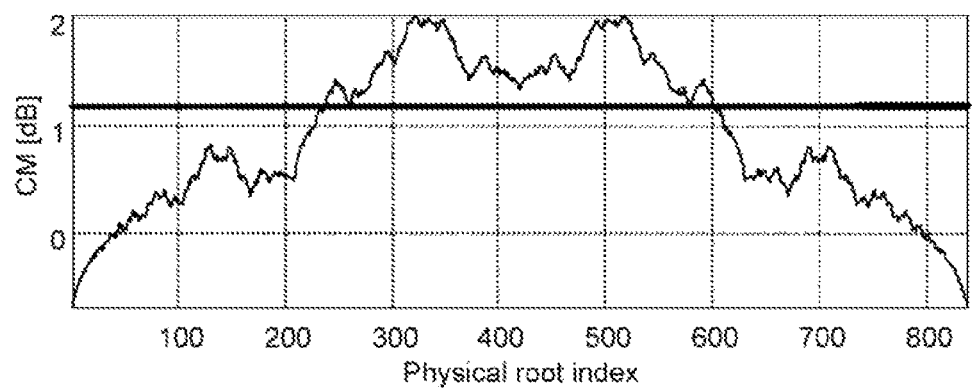
FIG. 24 is a graph showing CM characteristics according to physical root indexes according to one exemplary embodiment of the present invention.

FIG. 24 is a graph showing CM characteristics according to physical root indexes according to one exemplary embodiment of the present invention.

Referring to FIG. 24, the sequence class may be defined according to physical indexes. The physical root indexes may be classified by setting a CM classification threshold value. The classification of the physical root indexes may be simply performed by checking whether or not a selected physical index belongs to a high CM region or a low CM region. For example, it can be noted that, if a CM classification threshold value is 1.2 dB, a high CM region may be determined as [238, $N_{ZC}$-238]. The use of such method allows generation of indexes through a simple numerical formula to order the indexes (or index mapping) without the necessity of a complicated table.

Mapping to a physical index $u_{phy}(u_{log})$ in response to a logical index $u_{log}$ based on the maximum supportable cell size (or Ncs) can be expressed as shown $$u_{phy}(6 \cdot (i-1) + 2 \cdot j - 1) = \begin{cases} u'(\alpha_{i,j}), & j=1,2,3 \quad i=1,2,\ldots,139 \\ u'(\alpha_{i,j+1}), & j=1,2 \quad\quad i=140 \end{cases}$$

[Equation 6]

$$u_{phy}(2 \cdot i) = N_{ZC} - u_{phy}(2 \cdot i - 1),$$

$$i = 1, 2, \ldots, (N_{ZC} - 1)/2$$

where $\alpha_{i,1}=(N_{ZC}+1)$, $\alpha_{i,2}=2i-1$, $\alpha_{i,3}=2i$ and $u'(r)=(-1/r) \bmod N_{ZC}$.

One example of selecting an adjacent available index when a plurality of indexes are used in a cell can be expressed as shown $$u = \begin{cases} u_{phy}(u_{log}++), & \text{if } I_t < u_{phy}(u_{log}++) < N - I_t \text{ and} \\ & I_t < u_{phy}(u_{log}) < N - I_t \\ u_{phy}(u_{log}++), & \text{if } [u_{phy}(u_{log}++) \leq I_t \text{ or} \\ & u_{phy}(u_{log}++) \geq N - I_t] \text{ and} \\ & [u_{phy}(u_{log}) \leq I_t \text{ or } u_{phy}(u_{log}) \geq I_t] \end{cases}$$ [Equation 7]

where, $u_{log}++$ indicates the next logical indexes (e.g., $u_{log}+1, u_{log}+2, u_{log}+3, \ldots$) associated with $u_{log}$ and $I_t=238$. In this case, all the indexes are searched in a positive (+) direction (namely, in a direction that indexes increase). If a mixed CM index is not allowed, a searching procedure is simple. When a low CM sequence reaches a boundary of $N_{ZC}-1$ through the $u_{log}++$ procedure, it is set with a first logical index of $u_{log}++$. If, however, the mixed CM index is allowed, some conditions are necessary. If $u_{log}++$ reaches a boundary of an Ncs sequence, it is reset with a first logical index in a $u_{log}++$ Ncs segment. If $u_{log}++$ reaches a boundary of the Ncs segment in the $u_{log}++$ process for a higher CM, $u_{log}++$ is reset with a first logical index of a next Ncs segment. In this case, as for the CM characteristics when $u_{log}++$ is reset, if the mixed CM index is not allowed, $u_{log}++$ can be reset with a first index having the same characteristics as those of a transmitted index, and if the mixed CM index is allowed, $u_{log}++$ can be reset with a higher CM or a lower CM which has been previously determined according to the characteristics of a transmitted index.

Another example of selecting an adjacent available index when a plurality of indexes are used in a cell can be expressed as shown $$u = \begin{cases} u_{phy}(u_{log}--), & \text{if } I_t < u_{phy}(u_{log}--) < N - I_t \text{ and} \\ & I_t < u_{phy}(u_{log}) < N - I_t \\ u_{phy}(u_{log}++), & \text{if } [u_{phy}(u_{log}++) \leq I_t \text{ or} \\ & u_{phy}(u_{log}++) \geq N - I_t] \text{ and} \\ & [u_{phy}(u_{log}) \leq I_t \text{ or } u_{phy}(u_{log}) \geq I_t] \end{cases}$$ [Equation 8]

where, $u_{log}++$ indicates the next logical indexes (e.g., $u_{log}+1, u_{log}+2, u_{log}+3, \ldots$) associated with $u_{log}$ and $I_t=238$. In this case, indexes are searched in positive (+) and negative (−) directions (namely, in a direction that indexes increase or decrease).

If it is difficult to express the ordering of indexes in numerical formula, each base station and each user equipment should have a large ordering table of 838*10 bits (1~838)=8,380 bits. However, if Equation 6 is given, each base station and each user equipment can use the maximum supportable cell size ordering without such an ordering table. Table 12 shows mapping from physical indexes to logical indexes based on the maximum supportable cell size using Equation 6.

TABLE 12

| No | Logical index | Physical root index |
|---|---|---|
| 0 | 1~50 | 2 837 838 1 419 420 560 279 559 280 629 210 336 503 671 168 699 140 240 599 719 120 734 105 746 93 466 373 755 84 229 610 305 534 769 70 581 258 129 710 779 60 112 727 783 56 367 472 543 296 |
| 1 | 51~100 | 148 691 233 606 530 309 574 265 797 42 80 759 799 40 572 267 146 693 766 73 804 35 235 604 302 537 484 355 808 31 435 404 809 30 29 810 405 434 811 28 812 27 433 406 603 236 356 483 661 178 |
| 2 | 101~150 | 74 765 48 791 815 24 536 303 703 136 68 771 287 552 753 86 43 796 818 21 307 532 266 573 819 20 761 78 39 800 286 553 317 522 261 578 383 456 125 714 357 482 402 437 274 565 702 137 151 688 |
| 3 | 151~200 | 181 658 329 510 242 597 190 649 744 95 637 202 717 122 61 778 824 15 736 103 471 368 622 217 256 583 711 128 825 14 729 110 55 784 636 203 586 253 546 293 721 118 284 555 697 142 750 89 263 576 |
| 4 | 201~250 | 288 551 37 802 608 231 535 304 827 12 260 579 709 130 268 571 46 793 816 23 34 805 358 481 660 179 563 276 632 207 523 316 441 398 616 223 531 308 409 430 549 290 145 694 133 706 91 748 374 465 |
| 5 | 251~300 | 829 10 612 227 533 306 439 400 569 270 135 704 143 696 132 707 773 66 550 289 83 756 378 461 611 228 830 9 424 415 598 241 106 733 786 53 201 638 346 493 666 173 351 488 678 161 500 339 495 344 |
| 6 | 301~350 | 216 623 731 108 584 255 782 57 448 391 121 718 16 823 831 8 372 467 149 690 345 494 738 101 331 508 254 585 450 389 514 325 582 257 412 427 594 245 542 297 655 184 197 642 321 518 311 528 251 588 |
| 7 | 351~400 | 294 545 775 64 557 282 141 698 832 7 631 208 104 735 447 392 382 457 648 191 318 521 47 792 396 443 273 566 403 436 218 621 780 59 813 26 13 826 768 71 538 301 570 269 375 464 675 164 82 757 |
| 8 | 401~450 | 144 695 665 174 87 752 438 401 98 741 790 49 687 152 501 338 169 670 833 6 601 238 119 720 774 65 663 176 88 751 134 705 677 162 81 758 408 431 371 468 234 605 17 822 107 732 366 473 330 509 |
| 9 | 451~500 | 739 100 50 789 701 138 340 499 669 170 681 158 498 341 590 249 640 199 497 342 171 668 685 154 343 496 248 591 624 215 740 99 469 370 492 347 489 350 175 664 486 353 239 600 300 539 187 652 417 422 |
| 10 | 501~550 | 211 628 834 5 561 278 139 700 686 153 525 314 157 682 639 200 194 645 742 97 487 352 513 326 163 676 491 348 365 474 237 602 806 33 150 689 764 75 275 564 51 788 394 445 189 650 243 596 298 541 |
| 11 | 551~600 | 725 114 644 195 517 322 212 627 507 332 166 673 299 540 475 364 182 657 393 446 246 593 716 123 520 319 626 213 526 313 333 506 654 185 512 327 595 244 115 724 362 477 250 589 312 527 683 156 667 172 |
| 12 | 601~650 | 647 192 96 743 785 54 124 715 777 62 292 547 397 442 221 618 224 615 762 77 458 381 480 359 277 562 281 558 835 4 505 334 167 672 186 653 646 193 516 323 592 247 320 519 679 160 369 470 116 723 |

TABLE 12-continued

| No | Logical index | Physical root index |
|----|---------------|---------------------|
| 13 | 651~700 | 781 58 127 712 295 544 272 567 225 614 429 410 205 634 291 548 760 79 459 380 206 633 399 440 220 619 271 568 754 85 462 377 747 92 11 828 414 425 580 259 770 69 454 385 575 264 803 36 18 821 |
| 14 | 701~750 | 147 692 25 814 407 432 807 32 485 354 177 662 490 349 165 674 337 502 416 423 188 651 745 94 52 787 183 656 328 511 643 196 726 113 476 363 324 515 428 411 625 214 159 680 310 529 684 155 198 641 |
| 15 | 751~800 | 117 722 361 478 556 283 776 63 451 388 109 730 204 635 737 102 390 449 222 617 728 111 426 413 460 379 609 230 384 455 749 90 45 794 285 554 67 772 386 453 607 232 38 801 820 19 41 798 44 795 |
| 16 | 801~838 | 817 22 72 767 262 577 708 131 463 376 387 452 226 613 219 620 587 252 126 713 395 444 479 360 180 659 763 76 209 630 315 524 504 335 421 418 836 3 |

In all the exemplary embodiments as described above, when indexes are ordered based on certain characteristics, the order of values having the same characteristics does not affect the order of ordering. Also, the order of pair indexes does not affect the order of ordering. In the ordering (mapping) method according to all the exemplary embodiments, as the indexes increase, they are ordered in an ascending order that the CM or the maximum supportable cell size increases, but it is merely an example. That is, as the indexes increase, they may be ordered in the ascending order that the CM or the maximum supportable cell size is increased or in a descending order that the CM or the maximum supportable cell size is decreased in each group. In addition, the indexes may be ordered in the shape of a mountaintop (^) or in the shape of a mountain valley (v). And, the directionality of the CM or the maximum supportable cell size can be determined to be different in each group.

Figure 25:
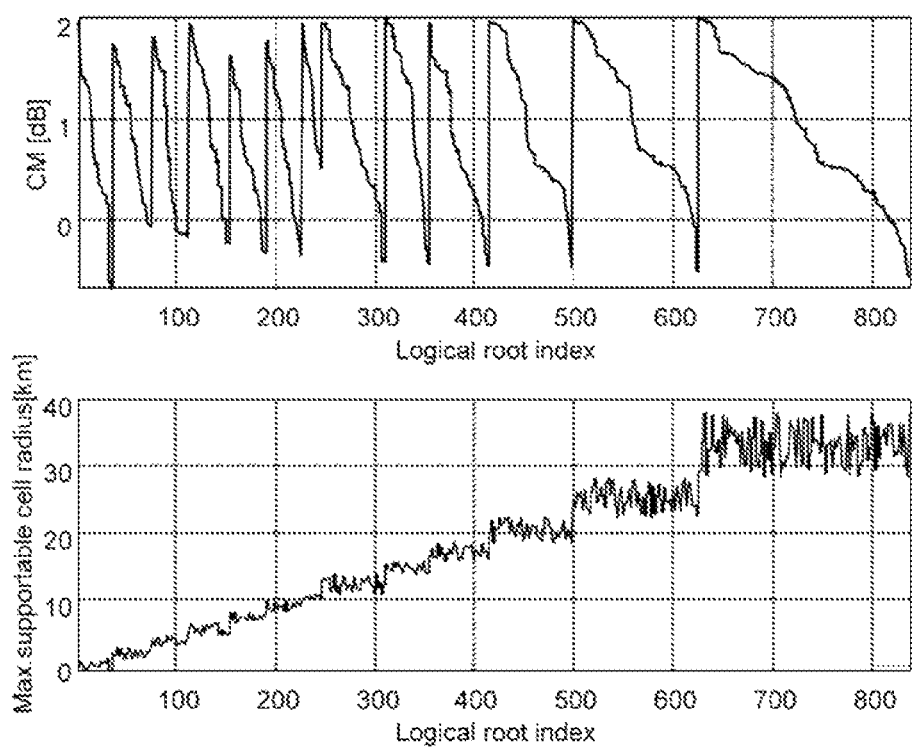
FIG. 25 is a graph showing CM characteristics and maximum supportable cell radius characteristics according to logical root indexes according to another exemplary embodiment of the present invention.
Figure 26:
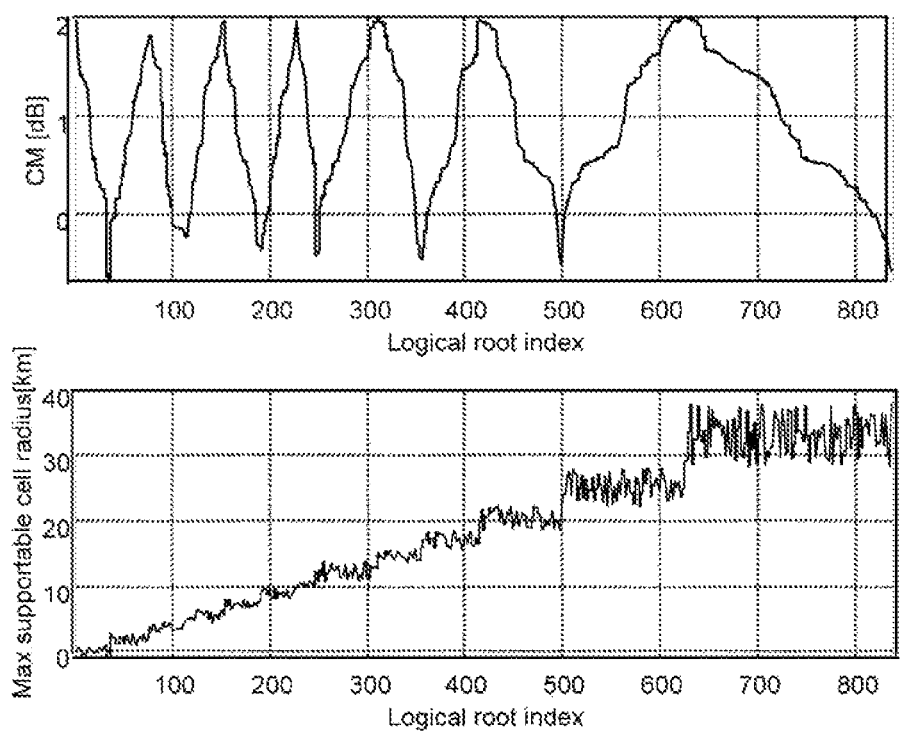
FIG. 26 is a graph showing CM characteristics and maximum supportable cell radius characteristics according to logical root indexes according to another exemplary embodiment of the present invention.

FIG. 25 is a graph showing CM characteristics and maximum supportable cell radius characteristics according to logical root indexes according to another exemplary embodiment of the present invention. As the logical indexes increase, they may be ordered in the ascending order that the maximum supportable cell size increases and in the descending order that the CM decreases. FIG. 26 is a graph showing the CM characteristics and the maximum supportable cell radius characteristics according to logical root indexes according to another exemplary embodiment of the present invention. Respective CM groups have been grouped based on the cyclic shift parameter Ncs. As the logical indexes increase, they are ordered in the ascending order that the maximum supportable cell radius size increases, in the descending order that the odd number groups of the CM decrease, and in the ascending order that the even number groups of the CM increase.

Referring to FIGS. 25 and 26, the directionality of the CM or the maximum supportable cell size may be determined to be different in each group. After the indexes are ordered in the ascending order that the maximum supportable cell size increases, when the indexes are ordered in the descending order that the CM decreases, the results appear as shown in FIG. 25. When the odd number groups are ordered in the descending order that the CM decreases and the even number groups are ordered in the ascending order that the CM increases, the results appear as shown in FIG. 26. By making the ordering in adjacent (consecutive) groups different, a larger number of adjacent (consecutive) indexes having low CM can be used in a low mobility cell regardless of the maximum supportable cell radius.

In all the exemplary embodiments as described above, if a single index is allocated in each cell in the ordering (mapping) method, each user equipment may use indexes by adding 1 to or subtracting 1 from a transmitted index, namely, by increasing or decreasing 1 at a time as necessary in order to meet the required number of random access preambles per cell. In case of using indexes by adding 1 at a time, when the largest index 838 is used, it may return to the smallest index 1 to use it. In case of using indexes by subtracting 1 at a time, when the smallest index 1 is used, it may return to the largest index 838 to use it. In addition, the ascending direction (+/−) may be used differently according to each characteristics (e.g., a lower CM/a higher CM). When the indexes are ordered in the ascending direction that the maximum supportable cell size increases as the indexes increase, because available indexes are limited in a large cell, it would be preferred to allocate indexes starting from a large cell. In this case, the simplest method of cell planning is to allocate the largest index to the largest cell and then use indexes by stages by subtracting 1 at a time.

<Embodiment of Hybrid Ordering>

Figure 27:
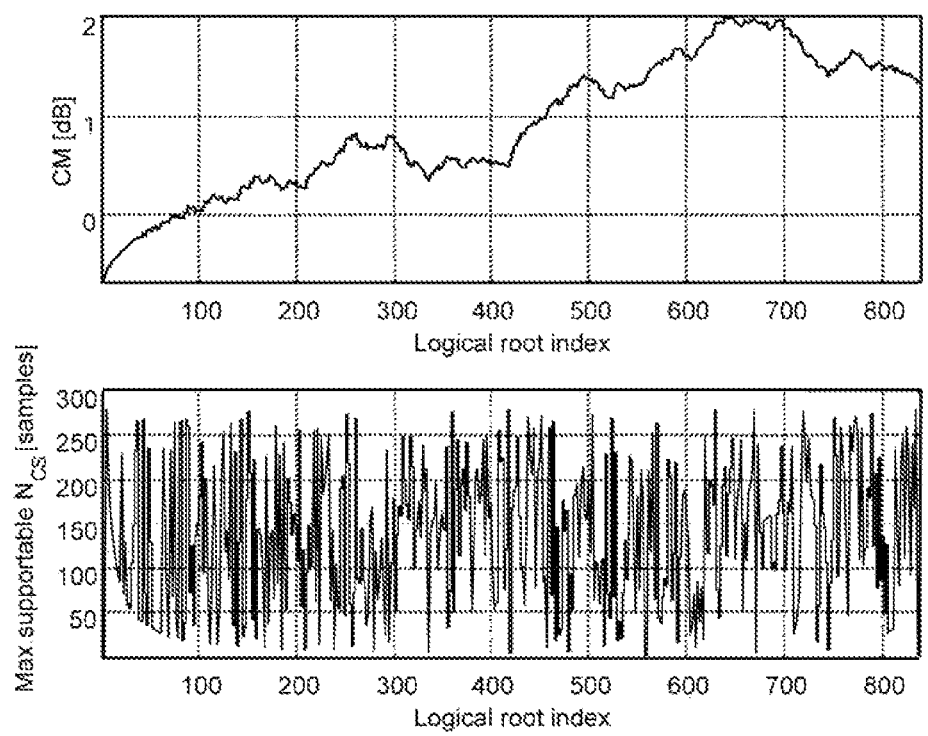
FIG. 27 is a graph showing a process of grouping CM ordering into two groups.
Figure 28:
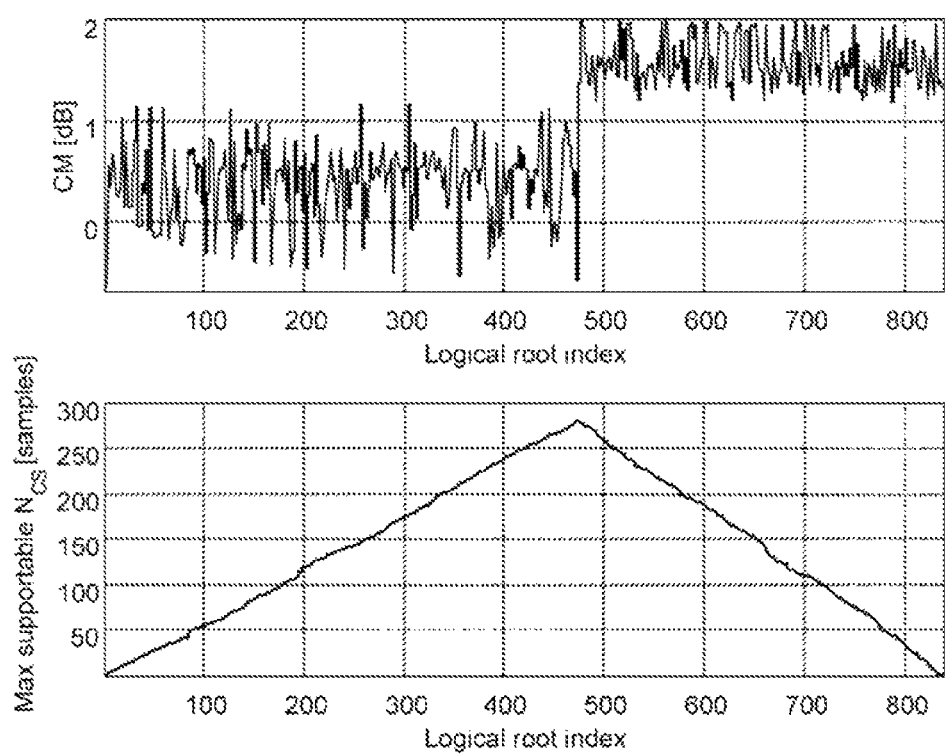
FIG. 28 is a graph showing a process of grouping indexes ordered according to maximum supportable Ncs characteristics into Ncs groups in each group.
Figure 29:
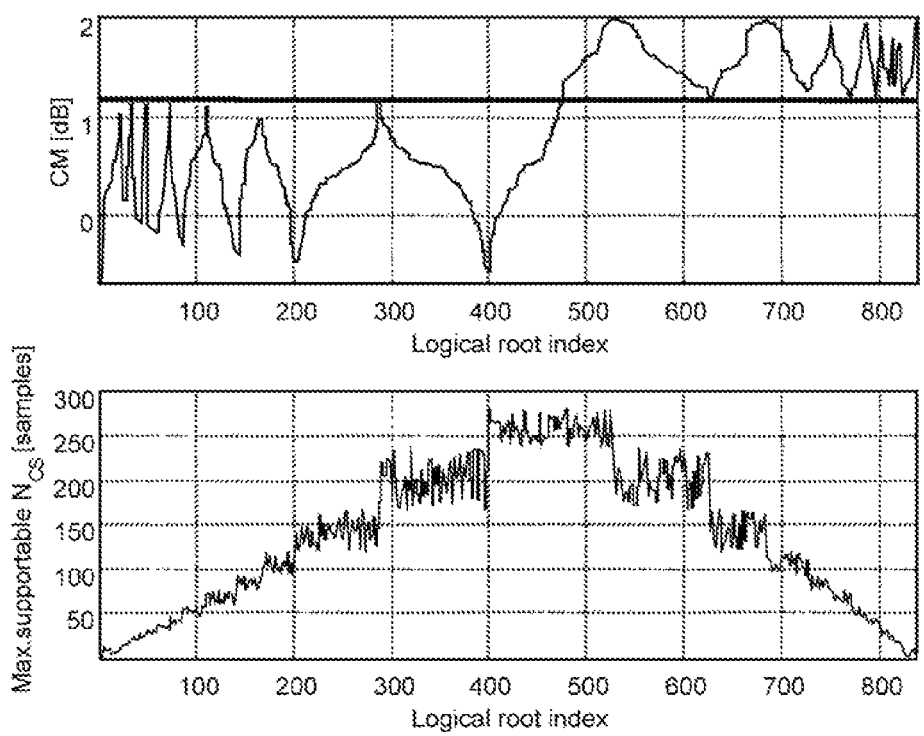
FIG. 29 is a graph showing a process of ordering indexes according to the CM characteristics in each Ncs group.

FIG. 27 is a graph showing a process of grouping CM ordering into two groups. FIG. 28 is a graph showing a process of grouping indexes ordered according to maximum supportable Ncs characteristics into Ncs groups in each group. FIG. 29 is a graph showing a process of ordering indexes according to the CM characteristics in each Ncs group.

Referring to FIGS. 27 to 29, (1) the indexes are ordered according to the CM characteristics. The indexes are divided into a group higher than 1.2 dB, the QPSK CM of the SC-FDMA, and a group lower than 1.2 dB as shown in FIG. 27.

(2) After the entire indexes are ordered according to the maximum cell radius, they are divided into sections according to the Ncs value (or the maximum supportable cell radius value). After the respective groups are ordered according to the maximum supportable cell radius, they are divided into sections with a maximum supportable cell radius value with respect to the Ncs. In this case, the groups may be all divided into different groups according to the Ncs value, several particular Ncs values can be divisionally grouped, or a particular Ncs value can be further divided. Here, the case of using the groups corresponding to every Ncs value is used, and the divided sections are as shown in FIG. 28.

(3) The indexes are ordered according to the CM characteristics in each divided section as shown in FIG. 29. Here, as the Ncs sample values, 13, 15, 18, 22, 26, 32, 38, 46, 59, 76, 119, 167, 237, 279, and 419 were used. Table 13 shows the relationship between the physical indexes and the logical indexes according to the results of FIG. 29.

TABLE 13

| No | Logical index | Physical index |
|---|---|---|
| 0 | 1~24 | 1 838 2 837 70 769 93 746 105 734 84 755 168 671 210 629 120 719 140 699 129 710 229 610 |
| 1 | ~28 | 60 779 56 783 |
| 2 | ~34 | 112 727 148 691 233 606 |
| 3 | ~42 | 80 759 73 766 42 797 40 799 |
| 4 | ~50 | 31 808 35 804 146 693 235 604 |
| 5 | ~60 | 236 603 28 811 30 809 27 812 29 810 |
| 6 | ~74 | 24 815 43 796 48 791 68 771 74 765 178 661 136 703 |
| 7 | ~86 | 125 714 86 753 78 761 39 800 20 819 21 818 |
| 8 | ~110 | 15 824 61 778 103 736 95 744 202 637 190 649 181 658 122 717 137 702 151 688 128 711 217 622 |
| 9 | ~142 | 231 608 130 709 142 697 179 660 203 636 118 721 207 632 110 729 89 750 55 784 46 793 37 802 34 805 23 816 14 825 12 827 |
| 10 | ~168 | 9 830 10 829 66 773 91 748 83 756 145 694 135 704 143 696 133 706 132 707 223 616 227 612 228 611 |
| 11 | ~202 | 216 623 149 690 141 698 121 718 197 642 161 678 201 638 184 655 173 666 108 731 106 733 101 738 57 782 64 775 53 786 16 823 8 831 |
| 12 | ~288 | 6 833 7 832 13 826 17 822 26 813 49 790 50 789 47 792 65 774 59 780 71 768 104 735 99 740 98 741 100 739 82 757 81 758 107 732 88 751 169 670 87 752 170 669 171 668 174 665 164 675 175 664 187 652 208 631 158 681 119 720 176 663 162 677 199 640 191 648 211 628 154 685 138 701 134 705 144 695 152 687 215 624 218 621 234 605 |
| 13 | ~400 | 237 602 225 614 224 615 221 618 220 619 150 689 127 712 147 692 213 626 153 686 212 627 139 700 123 716 124 715 156 683 157 682 177 662 182 657 192 647 195 644 194 645 193 646 115 724 189 650 114 725 205 634 206 633 200 639 185 654 116 723 160 679 163 676 186 653 172 667 166 673 167 672 79 760 97 742 85 754 96 743 77 762 92 747 75 764 58 781 62 777 69 770 54 785 51 788 36 803 33 806 32 807 25 814 18 821 11 828 5 834 4 835 |
| 14 | ~474 | 3 836 19 820 22 817 41 798 38 801 44 795 52 787 45 794 63 776 67 772 72 767 76 763 94 745 102 737 90 749 109 730 165 674 111 728 209 630 204 635 117 722 188 651 159 680 198 641 113 726 183 656 180 659 196 643 155 684 214 625 126 713 131 708 219 620 222 617 226 613 230 609 232 607 |
| 15 | ~528 | 262 577 252 587 418 421 416 423 413 426 411 428 376 463 395 444 283 556 285 554 379 460 390 449 363 476 384 455 388 451 386 453 361 478 387 452 360 479 310 529 354 485 328 511 315 524 337 502 349 490 335 504 324 515 |
| 16 | ~626 | 323 516 322 517 320 519 334 505 348 491 333 506 332 507 319 520 326 513 327 512 352 487 314 525 313 526 312 527 359 480 295 544 385 454 298 541 364 475 362 477 299 540 365 474 292 547 291 548 381 458 399 440 380 459 393 446 397 442 394 445 369 470 377 462 410 429 407 432 281 558 414 425 247 592 417 422 246 593 250 589 278 561 277 562 271 568 275 564 243 596 244 595 272 567 264 575 259 580 |
| 17 | ~684 | 238 601 239 600 269 570 273 566 249 590 248 591 282 557 403 436 375 464 408 431 371 468 396 443 370 469 401 438 392 447 366 473 382 457 300 539 301 538 353 486 343 496 342 497 350 489 340 499 341 498 318 521 338 501 347 492 330 509 |
| 18 | ~728 | 321 518 325 514 331 508 346 493 339 500 345 494 351 488 344 495 311 528 297 542 294 545 389 450 391 448 372 467 412 427 415 424 251 588 245 594 254 585 255 584 241 598 257 582 |
| 19 | ~752 | 270 569 276 563 374 465 409 430 378 461 398 441 400 439 290 549 289 550 306 533 308 531 316 523 |
| 20 | ~772 | 358 481 293 546 304 535 288 551 284 555 253 586 268 571 256 583 263 576 260 579 |
| 21 | ~786 | 242 597 274 565 402 437 368 471 383 456 357 482 329 510 |
| 22 | ~798 | 317 522 307 532 286 553 287 552 266 573 261 578 |
| 23 | ~802 | 303 536 356 483 |
| 24 | ~810 | 355 484 405 434 404 435 406 433 |
| 25 | ~814 | 267 572 302 537 |
| 26 | ~816 | 265 574 |
| 27 | ~822 | 367 472 296 543 309 530 |
| 28 | ~824 | 258 581 |
| 29 | ~838 | 240 599 419 420 279 560 280 559 373 466 305 534 336 503 |

In Table 13, there are groups having only a smaller number of indexes. Such groups having only a smaller number of indexes may be united with an adjacent group to constitute a single group.

In all the exemplary embodiments as described above, in case of pair allocation, relative positions of two adjacent pair indexes do not affect the proposed technique. In addition, when the indexes are ordered according to certain characteristics (e.g., the CM, the maximum supportable cell size (or Ncs, etc.)), the order of indexes having similar characteristics does not affect the proposed technique.

In use the above-described method, the user equipment and the base station should have a mapping table showing the relationship between the physical indexes and the logical indexes in each memory. In this case, the entire 838 indexes may be stored in each memory or only a half of them may be stored according to pair allocation. If only the half is stored, it may be assumed that (N-i)-th index is present after the i-th index, for processing.

When the indexes are ordered by using the above-described method and indexes available in a cell are informed to the base station, a method of informing about the number of Ncs configurations and a single logical index may be used. In this case, a single logical index can be informed by logical indexes 1 to 838 by using 10 bits. Alternatively, indexes 1 to 419 may be informed by using only one value of pair allocation with 9 bits. In this case, for the separate use of the pair allocation, an additional 1 bit may be used to indicate whether the used indexes are the front indexes 1 to 419 or the rear indexes 420 to 838 in the pair allocation. When indexes are informed with only 9 bits, they can be processed on the assumption that the (N-i)-th index follows the i-th index.

Figure 30:
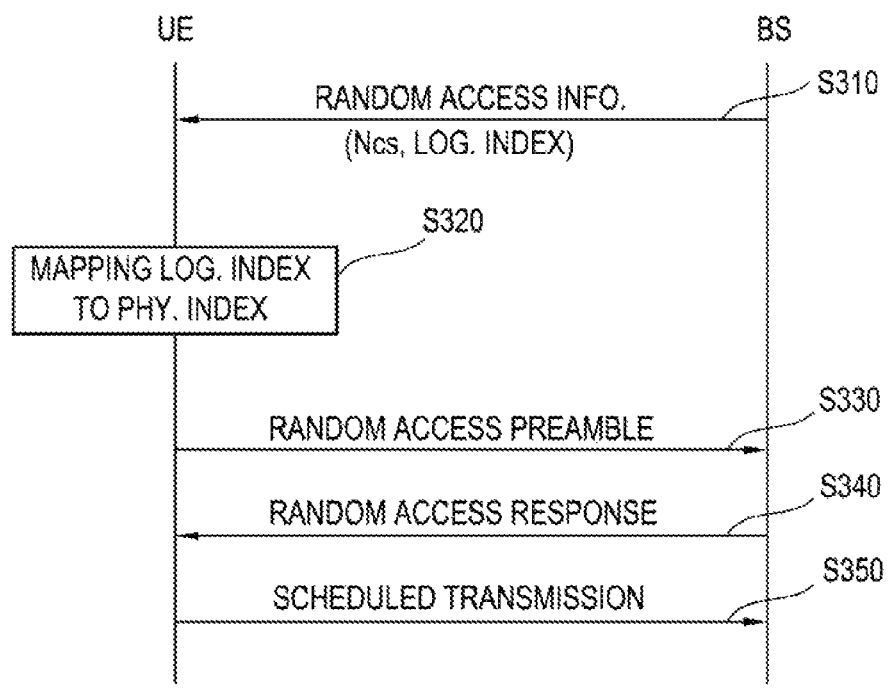
FIG. 30 is a flow chart illustrating the random access procedure according to one exemplary embodiment of the present invention.

FIG. 30 is a flow chart illustrating the random access procedure according to one exemplary embodiment of the present invention.

Referring to FIG. 30, a user equipment (UE) receives random access information from the base station (BS) (S310). The random access information includes information about a cyclic shift parameter Ncs and information about generation of a plurality of random access preambles. The cyclic shift parameter Ncs is used to obtain the value of cyclic shift of a root ZC sequence. The information about generation of a random access preamble is information regarding a logical index. The logical index is an index to which a physical root index of a root ZC sequence is mapped. The logical index becomes a source index for generating a set of random access preambles.

The information about the cyclic shift parameter Ncs and the logical index may be broadcasted as part of system information or transmitted on a downlink control channel. The method or format of transmitting the cyclic shift parameter Ncs or the logical index is not limited.

The user equipment acquires mapped physical root indexes from the logical index (S320). There are 64 preambles available in each cell. The set of 64 preamble sequences in a cell is found by including first, in the order of increasing cyclic shift, all the available cyclic shifts of a root Zadoff-Chu sequence with the logical index. Additional preamble sequences, in case 64 random access preambles cannot be generated from a single root Zadoff-Chu sequence, are obtained from the root sequences with the consecutive logical indexes until all the 64 sequences are found. The logical root sequence order is cyclic: the logical index 0 is consecutive to 837 when Nzc=838. Thus, the user equipment can find every available random access preamble through the single logical index.

Even if the base station informs the user equipment about only a single logical index, the user equipment can find the available 64 random access preambles. In addition, the root ZC sequences corresponding to the consecutive logical indexes have similar characteristics, all the generated sequences have substantially similar characteristics. Also, the root ZC sequences corresponding to the consecutive logical indexes may have complex conjugate symmetry which means the sum of two root index of the root ZC sequences corresponding to the two consecutive logical indexes is equal to the length of a root ZC sequence.

The logical indexes can be mapped to the physical root indexes of the root ZC sequence in sequence, after the physical root indexes are ordered according to the CM by subgroup. The subgroups have been obtained by grouping the ZC sequences by the predetermined cyclic shift parameter. Even if a consecutive logical index is selected, root ZC sequences having similar characteristics as those of the existing logical index can be obtained. Thus, only with a single logical index, the user equipment can acquire the 64 preamble sequences required for selecting the random access preamble.

As mentioned above, the logical index is the index to which the physical indexes are mapped in a state that the ZC sequences have been grouped into subgroups according to the predetermined cyclic shift parameter and ordered by the CM in each subgroup. Thus, the logical sequences belonging to a single subgroup have the same cyclic shift parameter. Although the base station allocates only the logical sequences in consideration of mobility of the user equipment, the user equipment can acquire the plurality of ZC sequences having the same cyclic shift parameter Ncs and similar CM characteristics.

The user equipment transmits a selected random access preamble to the base station on the RACH (Random Access Channel) (S330). That is, the user equipment randomly selects one of the 64 available random access preambles and transmits the selected random access preamble.

The base station transmits a random access response, a response to the random access preamble (S340). The random access response may be a MAC message configured in a MAC, a higher layer of a physical layer. The random access response is transmitted on a DL-SCH (Downlink Shared Channel). The random access response is addressed by an RA-RNTI (Random Access-Radio Network Temporary Identifier) transmitted on a PDCCH (Physical Downlink Control Channel). The RA-RNTI is a identifier to identify the used time/frequency resource for random access. The random access response may include timing alignment information, an initial uplink grant, and a temporary C-RNTI (Cell-Radio Network Temporary Identifier). The timing alignment information is timing correction information for uplink transmission. The initial uplink grant is ACK/NACK information with respect to the uplink transmission. The temporary C-RNTI refers to a user equipment's identifier that may not be permanent until collision is resolved.

The user equipment performs scheduled uplink transmission on a UL-SCH (S350). If there is data to be transmitted additionally as necessary, the user equipment performs uplink transmission to the base station and performs a collision settlement procedure.

If an error occurs in the transmission of the random access preamble, the random access procedure is delayed. Since the random access procedure is performed at an initial access to the base station or in a handover process to the base station, the delay of the random access procedure may cause an access delay or a service delay. A user equipment can obtain 64 preamble sequences suitable for the high speed environment, whereby the user equipment can reliably transmit the random access preamble in the high speed environment.

By using consecutive logical indexes, a set of random access preambles having similar physical characteristics can be generated. Control signaling to generate random access preambles can be minimized. Random access failure can be reduced under high speed environment and efficient cell planning can be performed.

Figure 31:
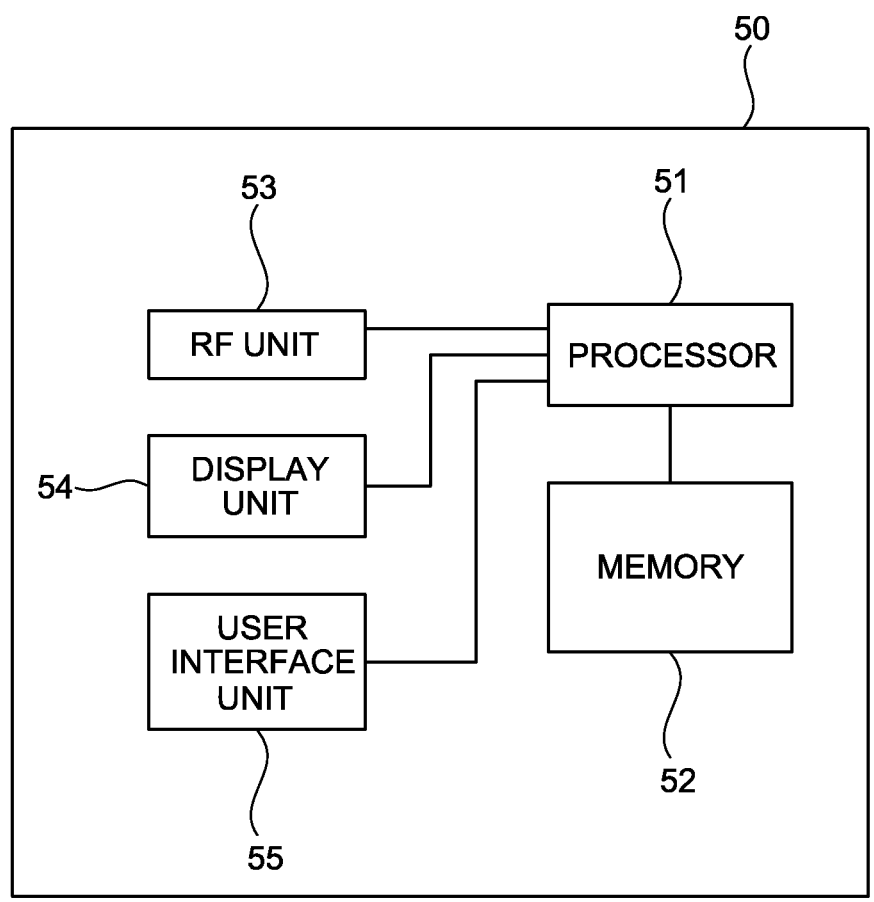
FIG. 31 is a schematic block diagram of elements of a user equipment to which the exemplary embodiments are applied.

FIG. 31 is a schematic block diagram of elements of a user equipment to which the exemplary embodiments are applied.

A user equipment 50 may include a processor 51, a memory 52, an RF unit 53, a display unit 54, and a user interface unit 55. The processor 51 may handle generation and mapping of sequences and implement functions regarding the various exemplary embodiments as described above. The memory 52 may be connected to the processor 51 and store an operating system, applications and files. The display unit 54 may display various information and use the known elements such as an LCD (Liquid Crystal Display), OLEDs (Organic Light Emitting Diodes), etc. The user interface unit 55 may be formed by combining user interfaces such as a keypad, a touch screen, or the like. The RF unit 53 is coupled to the processor 51 and transmits or receives radio signals.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of performing a random access procedure, the method performed by a user equipment (UE) and comprising:
receiving, at a radio frequency (RF) unit of the UE, a first logical index, wherein the first logical index is one of consecutive logical indexes mapped to physical root indexes of a root Zadoff-Chu (ZC) sequence, the physical root indexes are divided into subgroups according to cyclic shift parameters, and each of the subgroups includes at least one physical root index;
receiving, at the RF unit of the UE, information on a cyclic shift parameter; and
transmitting, at the RF unit of the UE, a random access preamble based on a preamble sequence, which is one of a predetermined number of available preamble sequences,
wherein the predetermined number of available preamble sequences are found, at a processor of the UE, by including preamble sequences in the order of increasing cyclic shift from a first root ZC sequence with a first physical root index mapped to the first logical index in a memory of the UE and by further including preamble sequences in the order of increasing cyclic shift from a second root ZC sequence with a second physical root index mapped to a second logical index in the memory of the UE when the predetermined number of available preamble sequences cannot be found from the first root ZC sequence, wherein the second logical index is consecutive to the first logical index,
wherein a sum of the first physical root index and the second physical root index is equal to a length of the root ZC sequence, wherein a value of the cyclic shift is obtained from the cyclic shift parameter.

2. The method of claim 1, wherein the predetermined number of random access available preamble sequences is 64.

3. The method of 1, wherein the first logical index is broadcasted.

4. The method of 1, wherein k-th element c(k) of the root ZC sequence is defined by $$c(k) = \exp\left\{-\frac{j\pi Mk(k+1)}{N}\right\}, \text{ for } N \text{ odd}$$

-continued $$c(k) = \exp\left\{-\frac{j\pi Mk^2}{N}\right\}, \text{ for } N \text{ even}$$

where N is a length of the root ZC sequence and M is a physical root index and relatively prime to N.

5. A user equipment (UE) for performing a random access procedure, the UE comprising:
a radio frequency (RF) unit configured for:
receiving a first logical index, wherein the first logical index is one of consecutive logical indexes mapped to physical root indexes of a root Zadoff-Chu (ZC) sequence, the physical root indexes are divided into subgroups according to cyclic shift parameters, and each of the subgroups includes at least one physical root index;
receiving information on a cyclic shift parameter; and
transmitting a random access preamble based on a preamble sequence, which is one of a predetermined number of available preamble sequences,
a memory configured for storing the first logical index; and
a processor configured for finding the predetermined number of available preamble sequences, wherein the predetermined number of available preamble sequences are found by including preamble sequences in the order of increasing cyclic shift from a first root ZC sequence with a first physical root index mapped to the first logical index in the memory of the UE and by further including preamble sequences in the order of increasing cyclic shift from a second root ZC sequence with a second physical root index mapped to a second logical index in the memory of the UE when the predetermined number of available preamble sequences cannot be found from the first root ZC sequence, wherein the second logical index is consecutive to the first logical index, wherein a sum of the first physical root index and the second physical root index is equal to a length of the root ZC sequence, wherein a value of the cyclic shift is obtained from the cyclic shift parameter.

6. The user equipment of claim 5, wherein the predetermined number of random access available preamble sequences is 64.

7. The user equipment of claim 5, wherein the first logical index is broadcasted.

8. The user equipment of claim 5, wherein k-th element c(k) of the root ZC sequence is defined by $$c(k) = \exp\left\{-\frac{j\pi Mk(k+1)}{N}\right\}, \text{ for } N \text{ odd}$$

$$c(k) = \exp\left\{-\frac{j\pi Mk^2}{N}\right\}, \text{ for } N \text{ even}$$

where N is a length of the root ZC sequence and M is a physical root index and relatively prime to N.

* * * * *